United States Patent [19]

Burke, Jr.

[11] 4,344,859

[45] * Aug. 17, 1982

[54] HOMOGENIZING SYSTEM FOR PRODUCING HIGH POLYMER LATICES

[75] Inventor: Oliver W. Burke, Jr., Fort Lauderdale, Fla.

[73] Assignee: Exxon Research and Engineering Company, Florham Park, N.J.

[*] Notice: The portion of the term of this patent subsequent to Aug. 17, 1996, has been disclaimed.

[21] Appl. No.: 105,151

[22] Filed: Dec. 19, 1979

Related U.S. Application Data

[60] Division of Ser. No. 539,607, Jan. 8, 1975, Pat. No. 4,243,566, which is a division of Ser. No. 323,381, Jan. 15, 1973, Pat. No. 3,862,078, said Ser. No. 323,381, is a continuation-in-part of Ser. No. 226,419, Feb. 15, 1972, Pat. No. 3,879,327, which is a continuation-in-part of Ser. No. 817,494, Apr. 18, 1969, abandoned, which is a continuation-in-part of Ser. No. 784,596, Dec. 18, 1968, Pat. No. 3,644,263, and a continuation-in-part of Ser. No. 767,790, Oct. 15, 1969, Pat. No. 3,622,127, and a continuation-in-part of Ser. No. 691,823, Dec. 10, 1969, abandoned, and a continuation-in-part of Ser. No. 70,949, Sep. 10, 1970, Pat. No. 3,652,482, and a continuation-in-part of Ser. No. 621,994, Mar. 9, 1967, Pat. No. 3,503,917.

[51] Int. Cl.$^3$ .......................... B01F 3/12; B01F 5/08; B01F 5/10; B01F 11/02
[52] U.S. Cl. ................................ 252/359 D; 366/124; 366/136; 366/159

[58] Field of Search ...................... 252/359 A, 359 D; 366/136, 159, 124

[56] References Cited

U.S. PATENT DOCUMENTS

| | | | |
|---|---|---|---|
| 3,835,061 | 9/1974 | Burke | 252/359 D |
| 4,115,316 | 9/1978 | Burke | 252/359 A |
| 4,127,332 | 11/1978 | Thiruvengadam et al. | 252/359 D |

Primary Examiner—Bradley Garris
Attorney, Agent, or Firm—J. Y. Houghton

[57] ABSTRACT

Combination of steps are disclosed which enable the preparation of stable latices of high solids content. The process is characterized, inter alia, by the establishment of a flow of steam as a continuous phase into which an emulsion of a cement of the polymer is dispersed as an aerosol of latex droplets in a solvent-vapor continuum, followed by coalescence of the latex droplets and separation of the resulting coalesced liquid phase from the resulting solvent-vapor phase. In one embodiment provision is made for the continuous production of aqueous emulsion of polymer solvent cement essentially entirely of precursor latex particle size, which may be of narrow size distribution, or may have imparted thereto a wider size distribution, or an altered particle size or viscosity or both.

In other embodiments special provisions are made for altering the viscosity of the aqueous polymer/solvent emulsion and/or of the latex product, by special treatment of at least a part thereof before delivery from the system.

8 Claims, 26 Drawing Figures

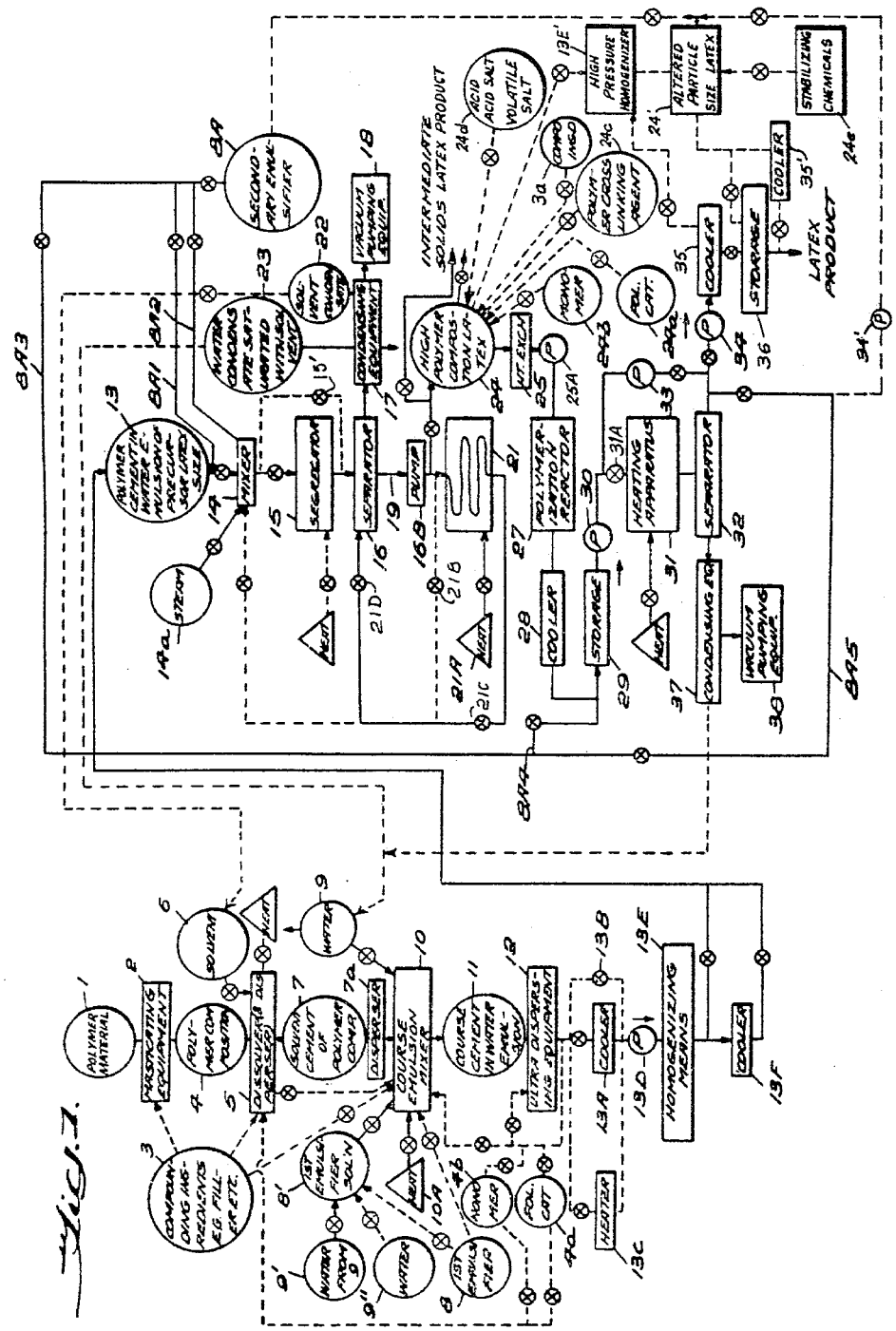

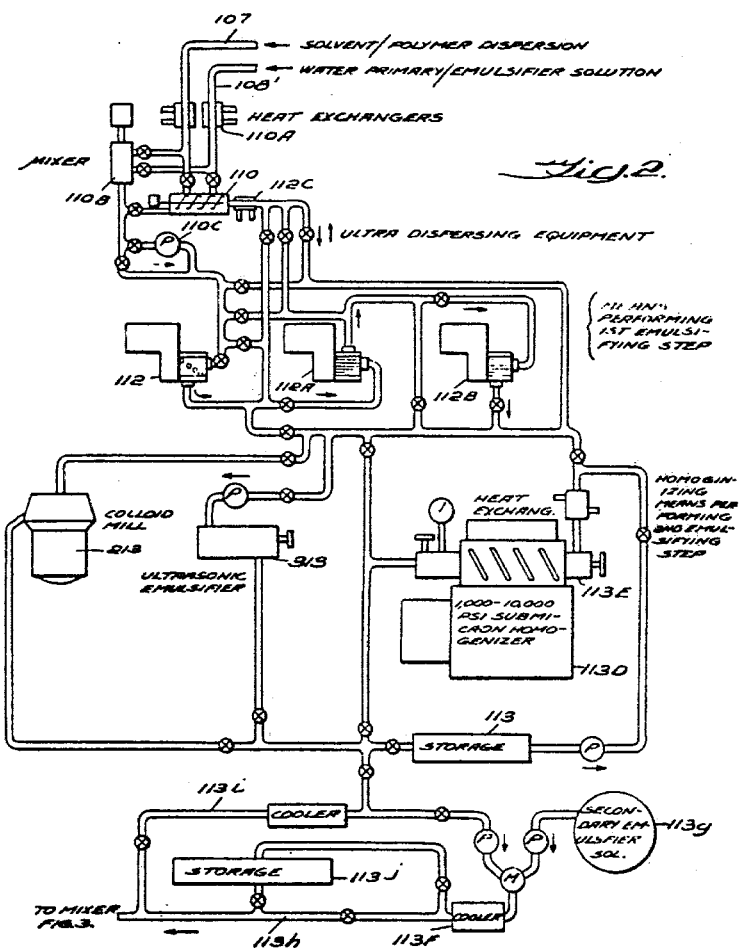

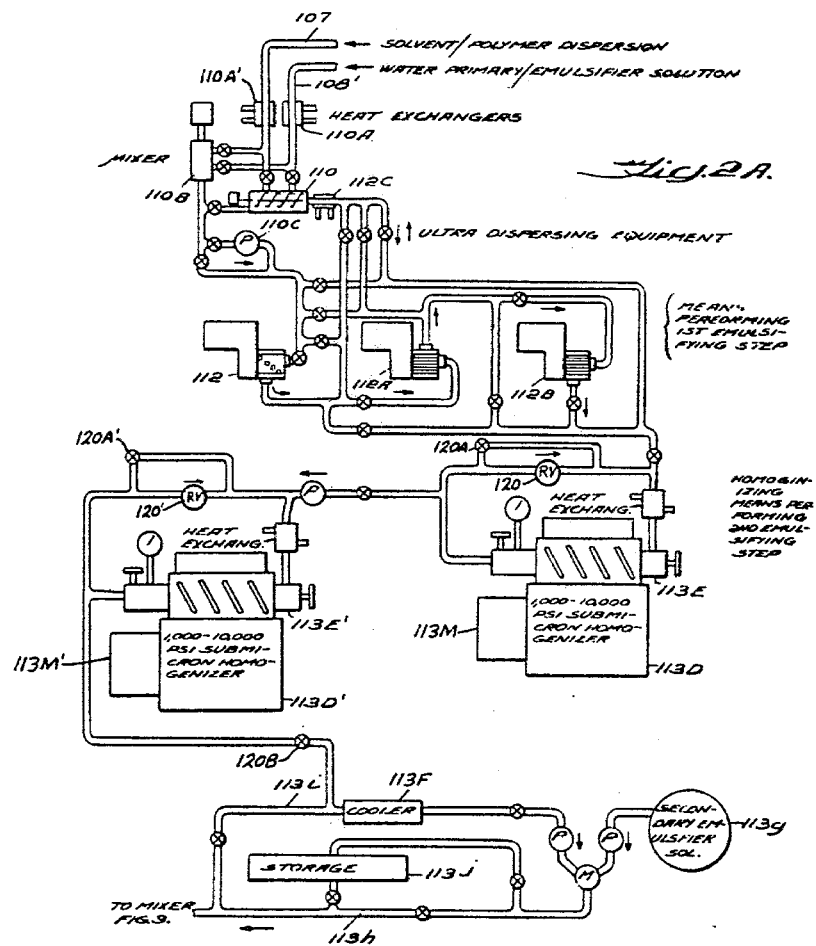

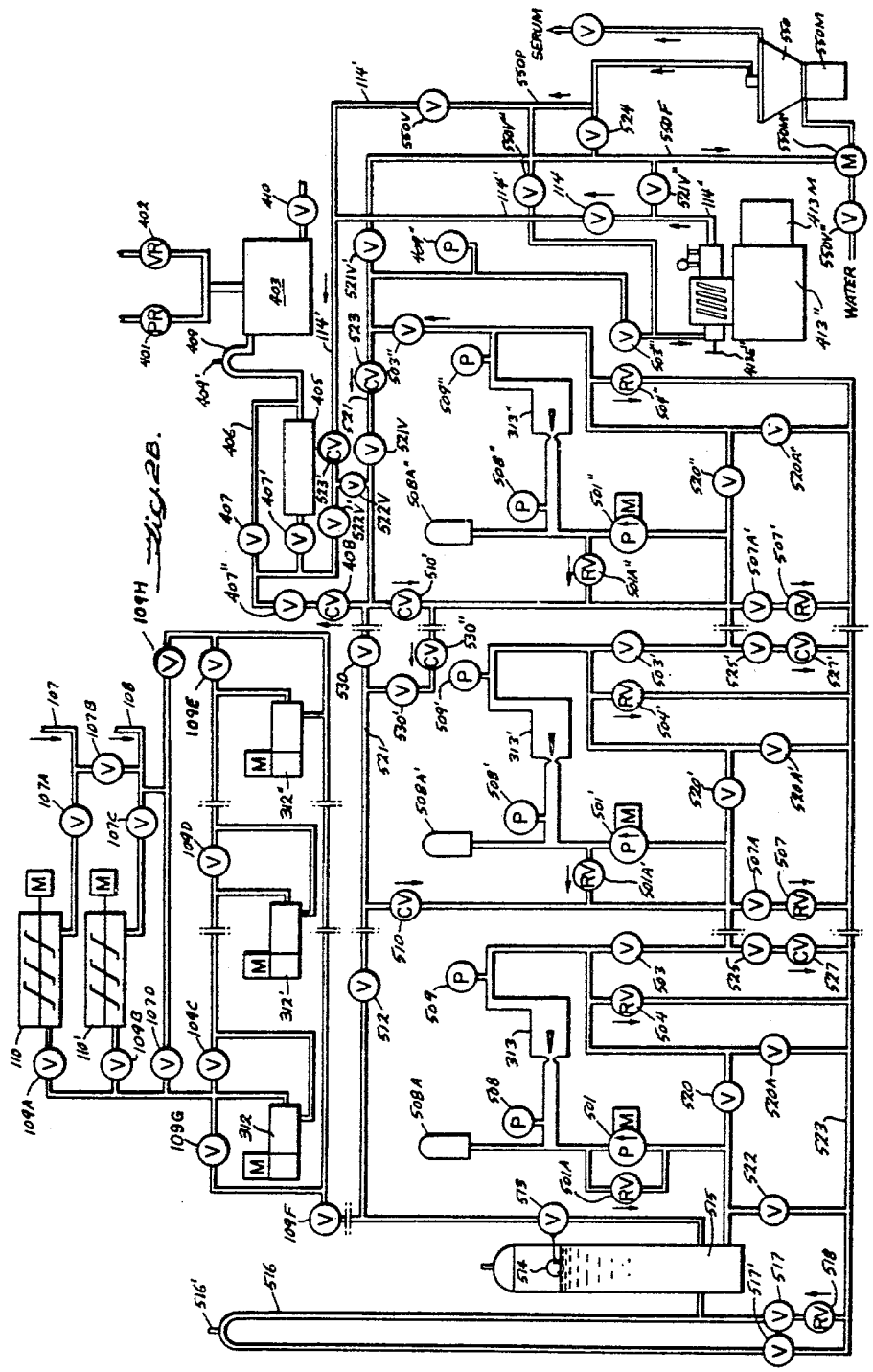

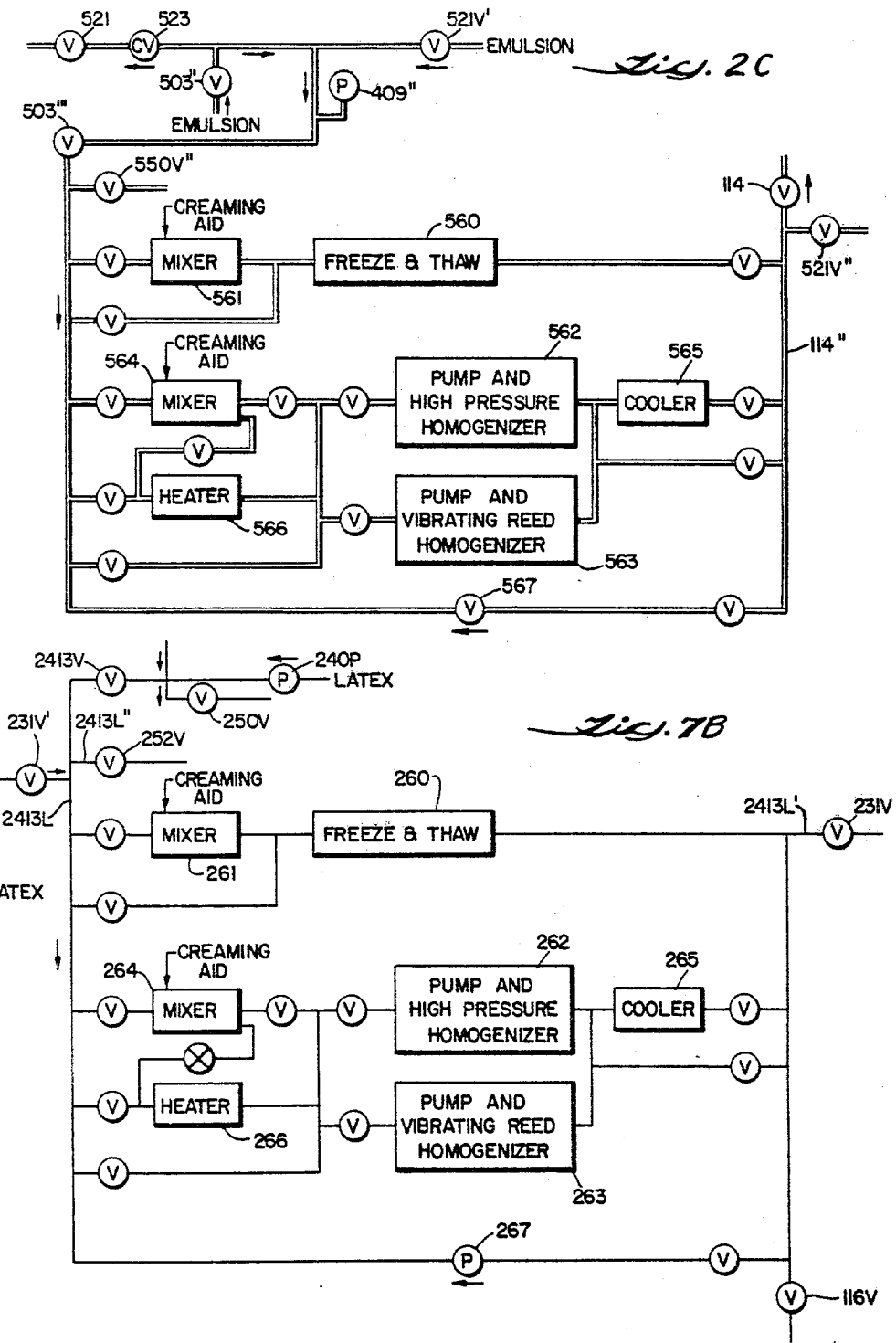

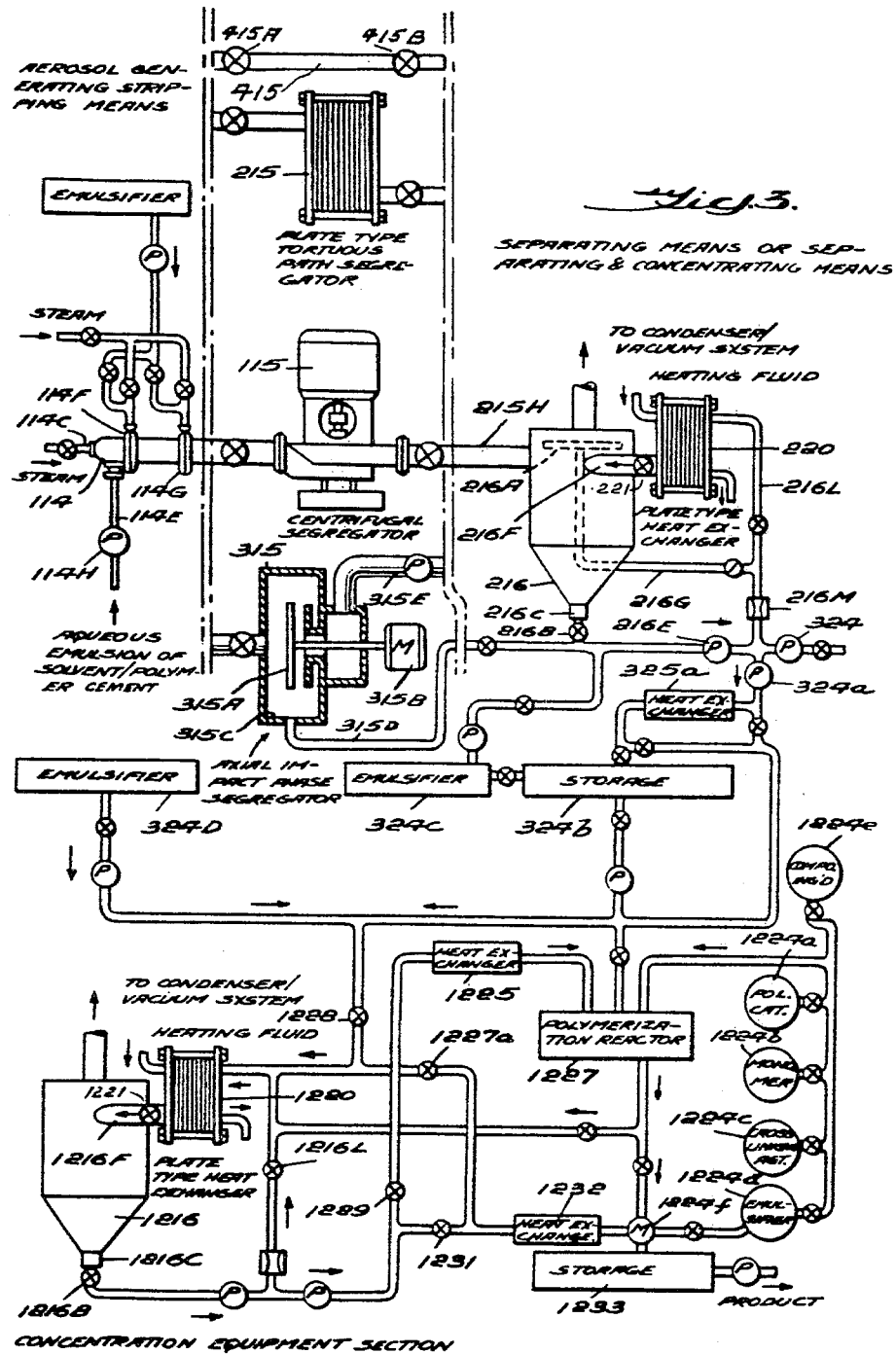

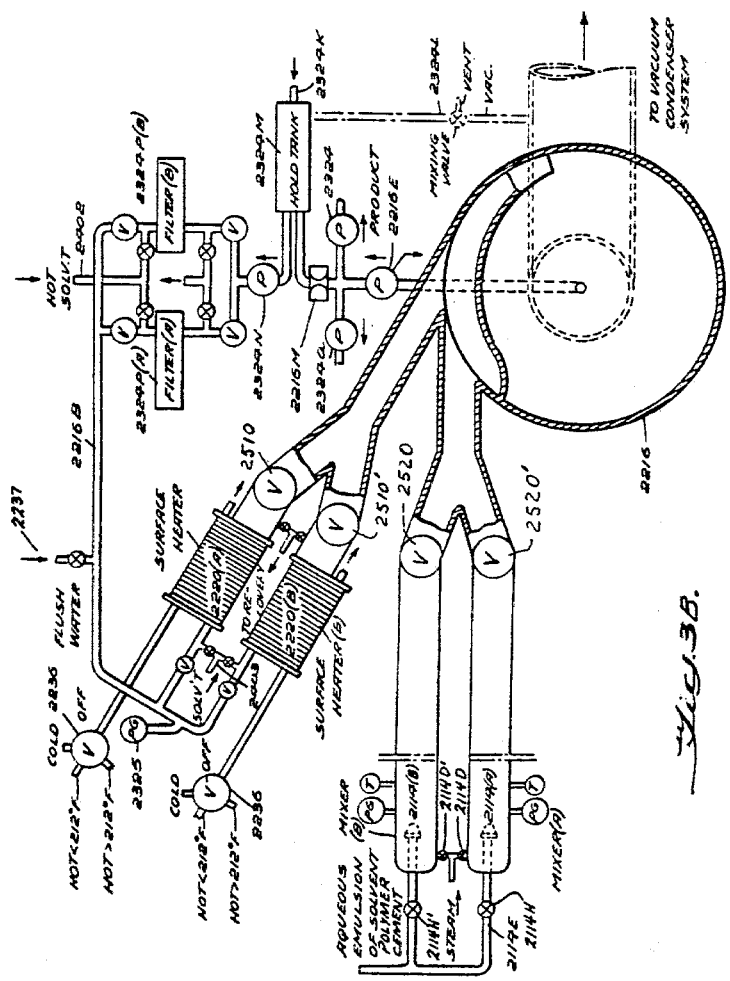

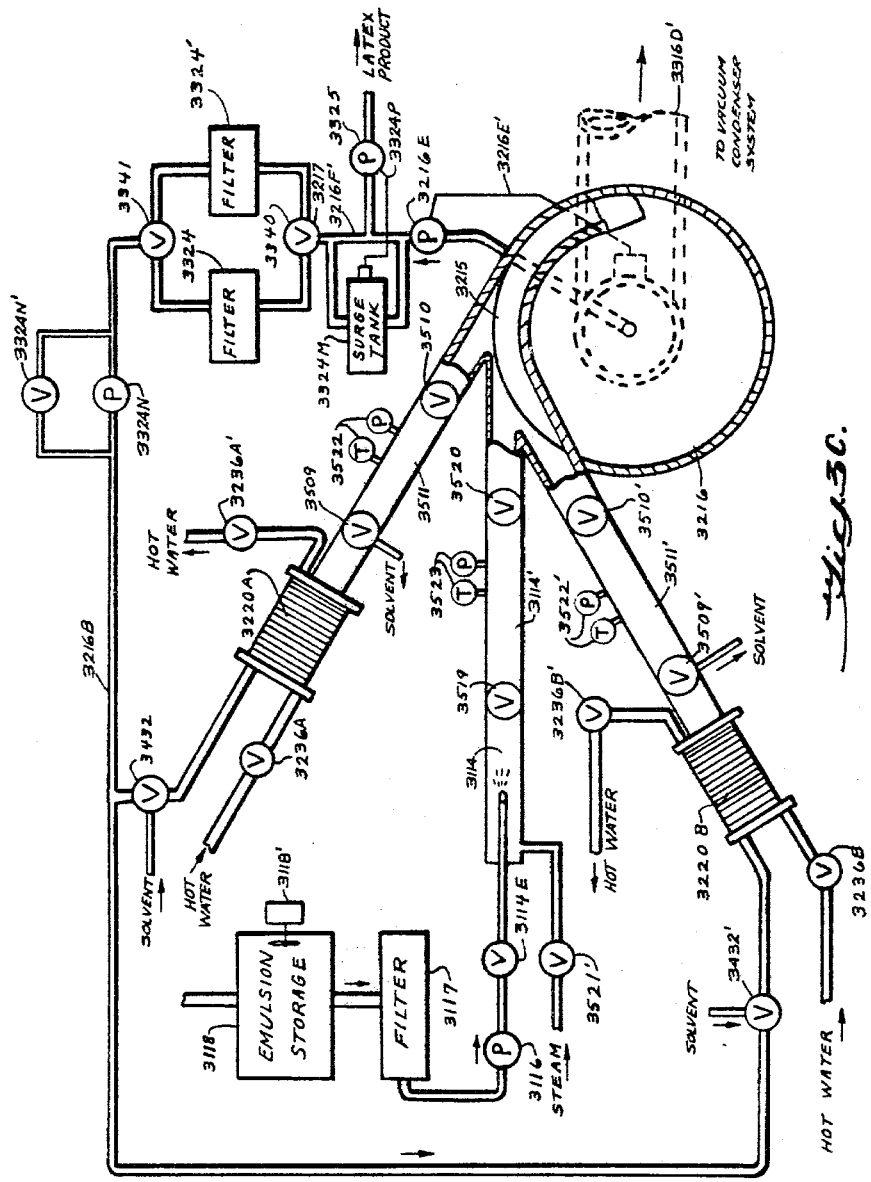

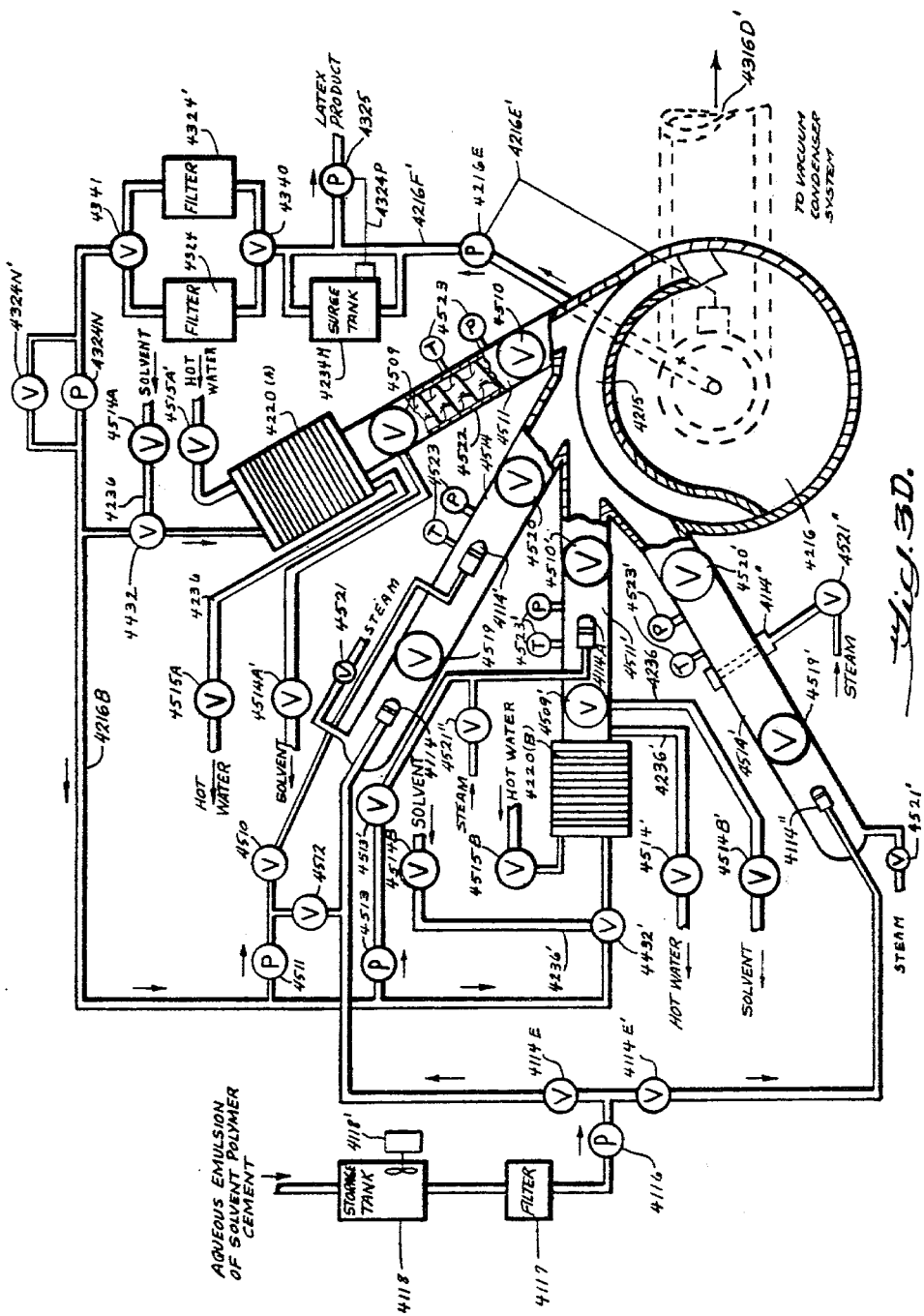

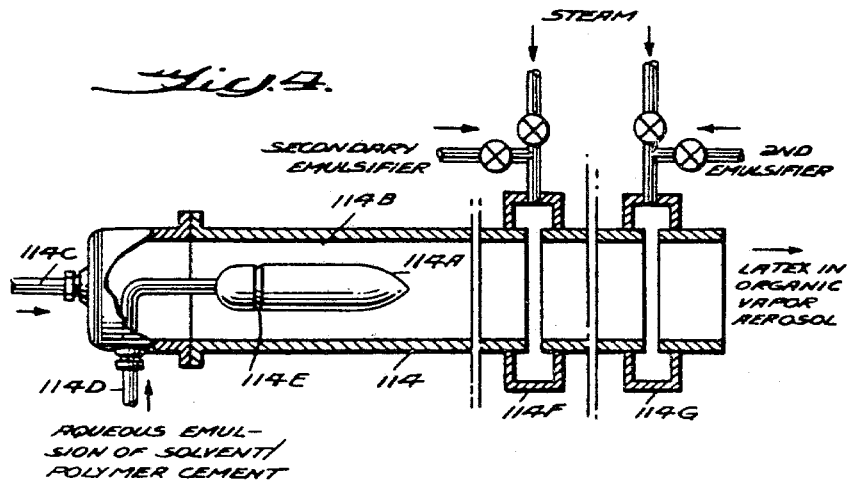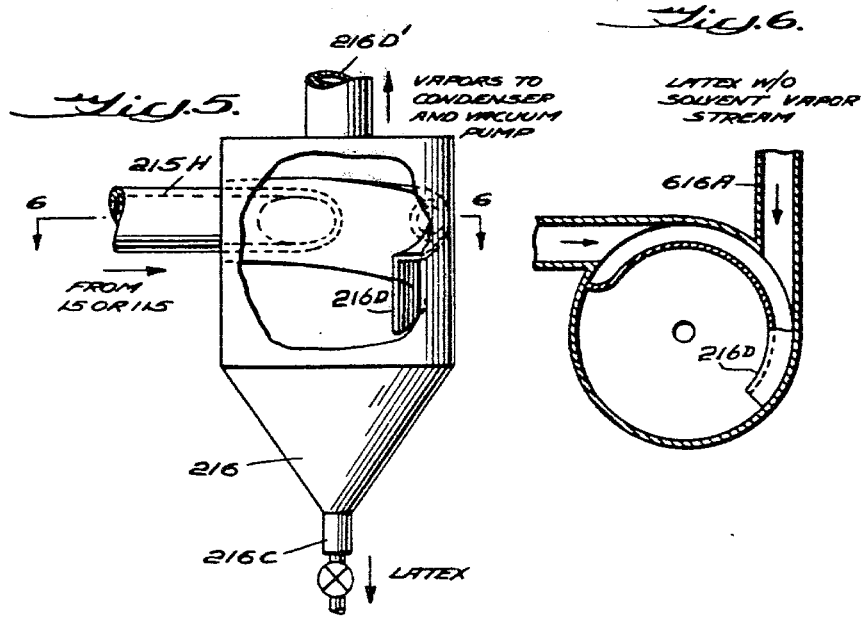

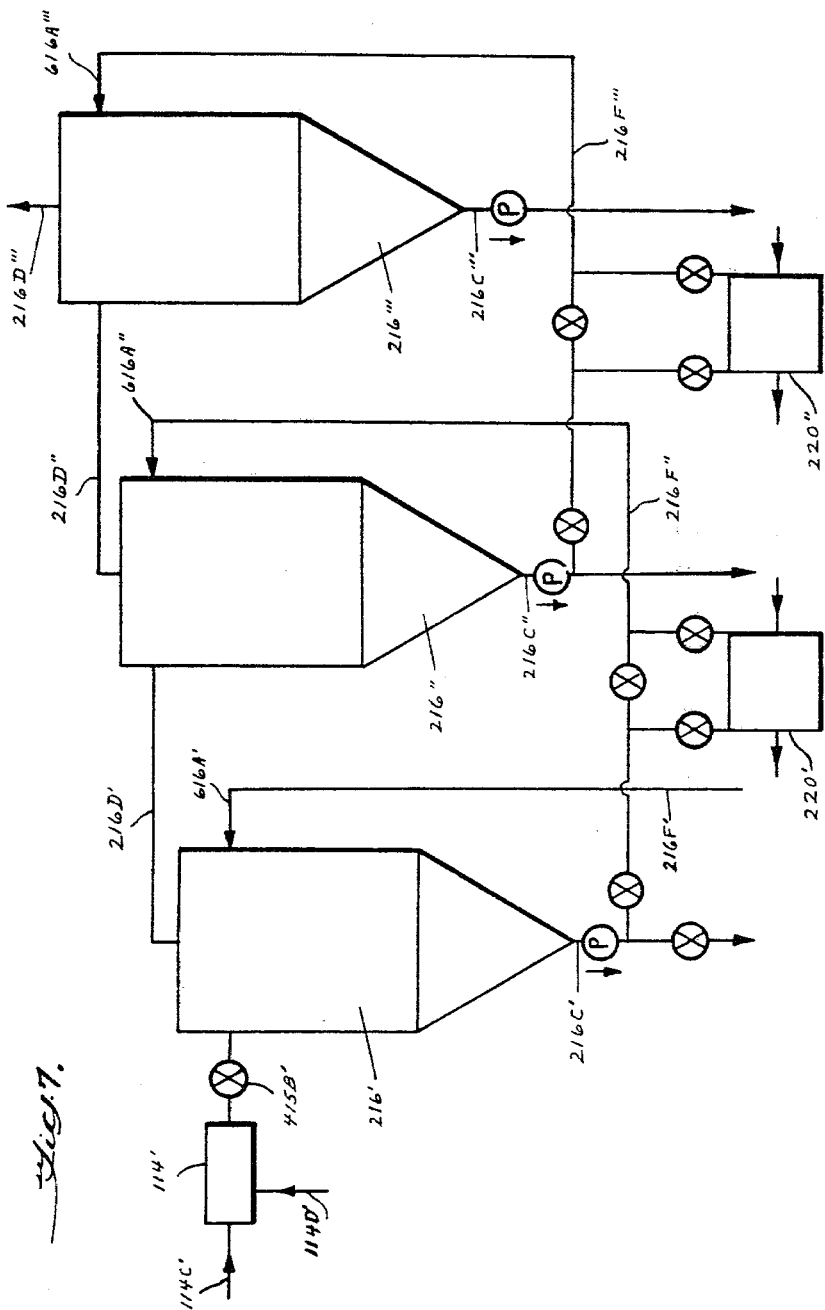

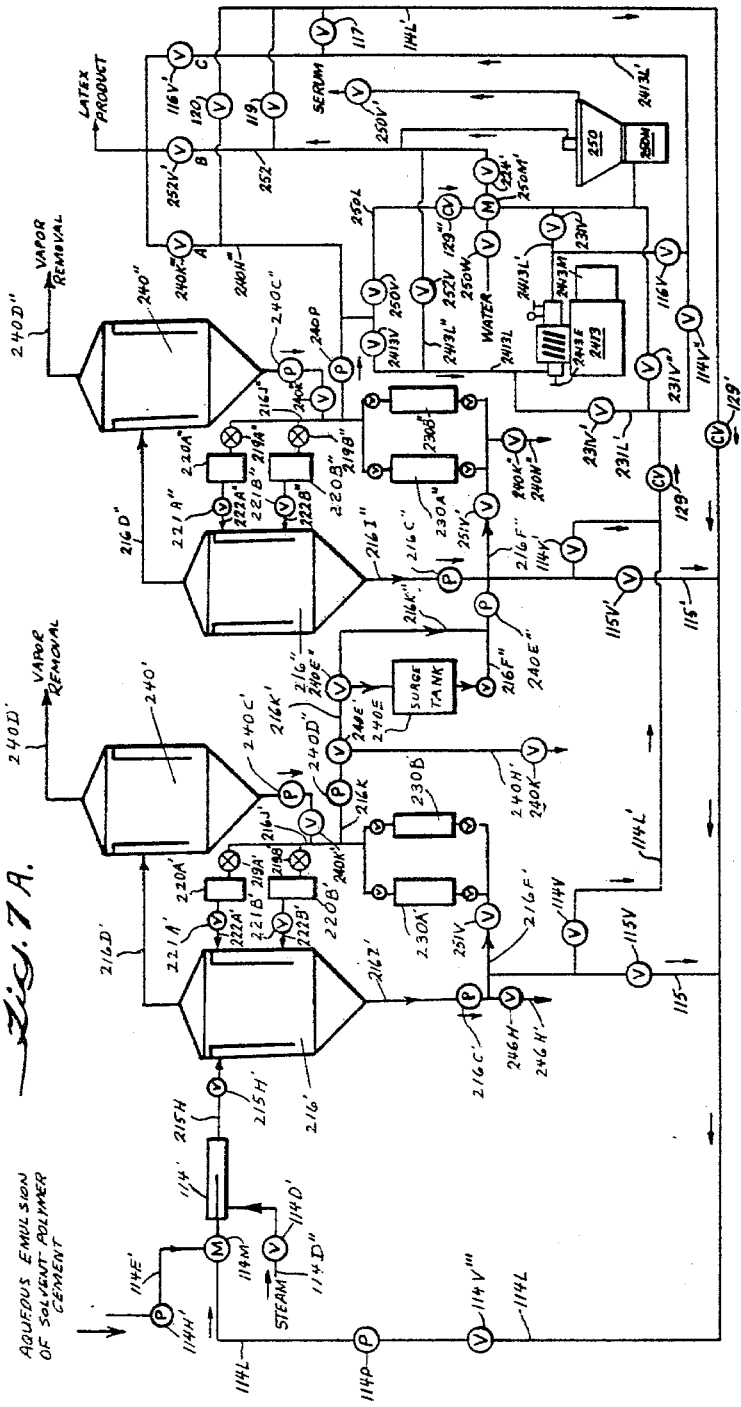

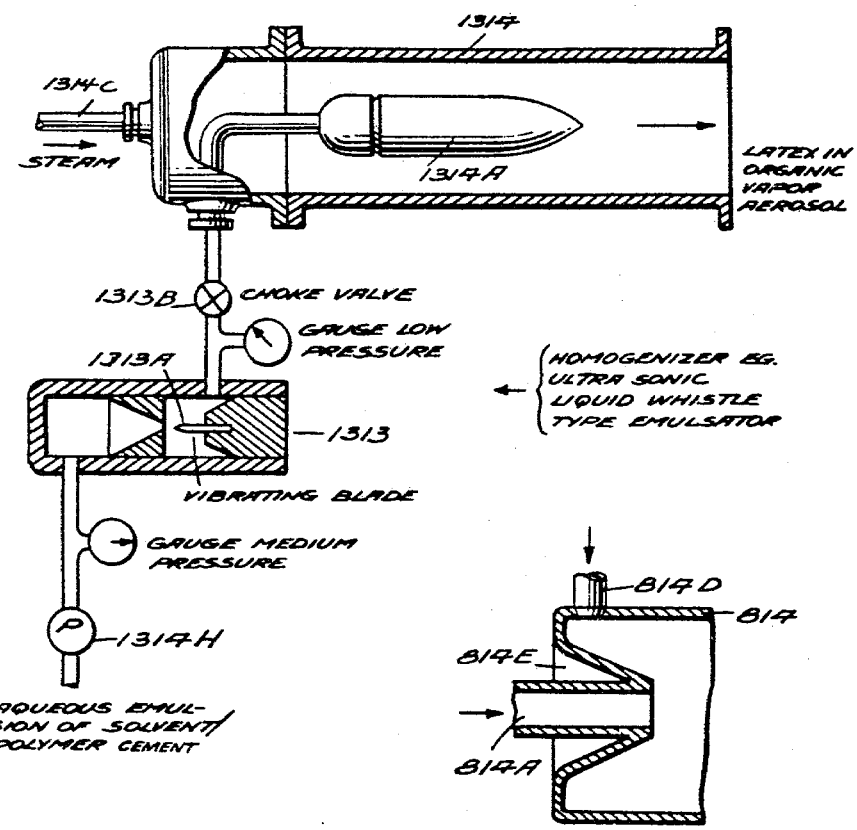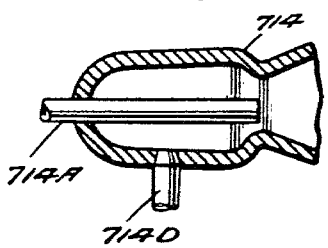

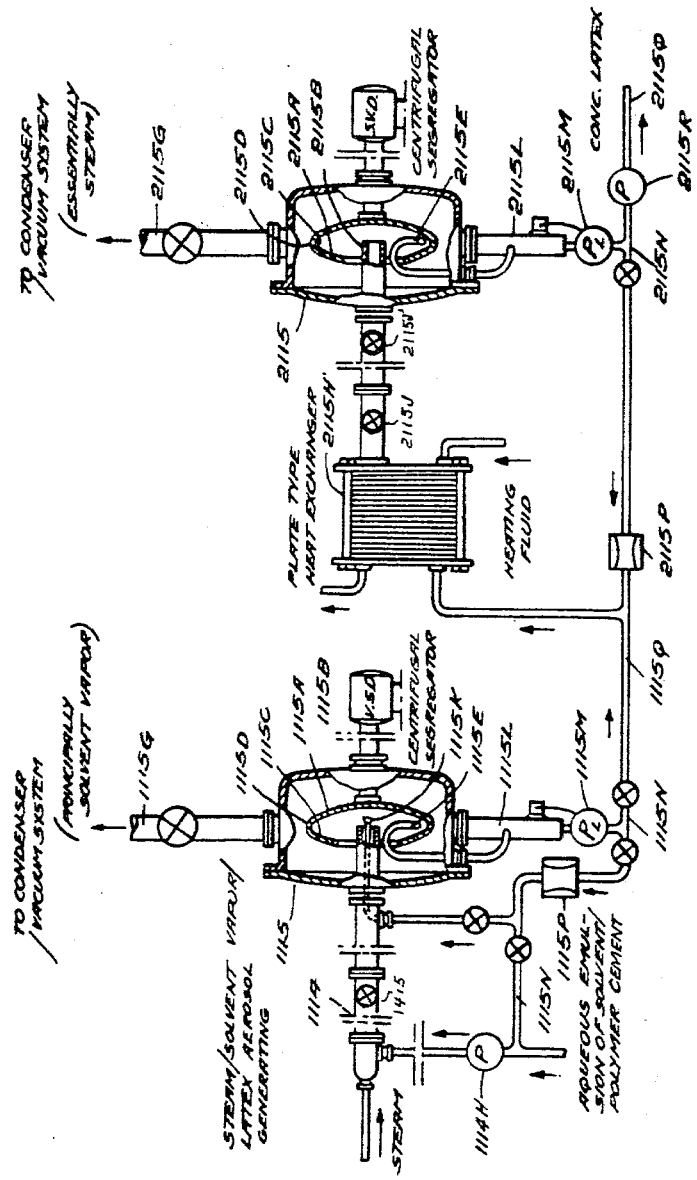

HOMOGENIZING SYSTEM FOR PRODUCING HIGH POLYMER LATICES

CROSS REFERENCE TO RELATED APPLICATIONS

The present application (Ser. No. 105,151 filed Dec. 19, 1979) is a division of Ser. No. 539,607 (filed Jan. 8, 1975, U.S. Pat. No. 4,243,566) which is a division of Ser. No. 323,381 (filed Jan. 15, 1973, U.S. Pat. No. 3,862,078). Said application Ser. No. 323,381 was a continuation-in-part (CIP) of Ser. No. 226,419 (filed Feb. 15, 1972, U.S. Pat. No. 3,879,327) which in turn was a CIP of Ser. No. 817,494 (filed Apr. 18, 1969 and abandoned after Feb. 15, 1972) which was a CIP of Ser. No. 784,596 (filed Dec. 18, 1968, U.S. Pat. No. 3,644,263), a CIP of Ser. No. 767,790 (filed Oct. 15, 1969, U.S. Pat. No. 3,622,127), a CIP of Ser. No. 691,823 (filed Dec. 10, 1967, now abandoned, and replaced by a CIP Ser. No. 70,949 filed Sept. 10, 1970, U.S. Pat. No. 3,652,482) and a CIP of Ser. No. 621,994 (filed Mar. 9, 1967, U.S. Pat. No. 3,503,917).

BACKGROUND OF THE INVENTION

1. Field of the Invention

This invention like those of my aforesaid copending applications relates to the production of high solids content aqueous latices with reduced losses, from solvent dispersions or cements of polymer compositions, and aims generally to provide improved method and apparatus combinations therefor, and new products produced thereby.

2. Description of the Prior Art

To date, in the practical art, synthetic latices of high polymers have been primarily prepared by emulsion polymerization, which can produce latices of uniform colloidal particle size. In contrast, it is difficult to prepare latices from the class of high polymers made by essentially anhydrous catalyst polymerizations. In this latter case it has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alia, in that (1) aqueous emulsification and stripping of solvent dispersions or cements of the high polymer materials, especially when dilute, have yielded latices of only medium solids and high emulsifier content which render them commercially impractical; (2) in that the emulsions have tended to foam excessively during stripping; and (3) in that the emulsions have tended to form coagulum by coalescence of the polymer phase as well as by drying out especially on contact with heated surfaces, during the stripping and/or concentrating processes, and (4) in that such processes have tended to yield latices of poor mechanical stability, i.e. latices which when subjected to mechanical shear during blending with other materials in the industrial applications thereof, are apt to undergo coagulation thereby rendering the blended materials unsuitable for their intended latex applications especially when the emulsifier content is low.

SUMMARY OF THE INVENTION

The particular improvements herein disclosed and claimed may be employed in practicing any of the several earlier embodiments of process and apparatus set forth in my aforesaid applications.

In such earlier embodiments, while the emulsification and homogenization under ideal conditions can produce an aqueous emulsion having substantially all of its dispersed particles of precursor latex particle size; considerations of economy, storage, or other factors, may result intentionally or unintentionally in the production of a fine emulsion that, while principally comprising dispersed particles of precursor latex particle size which on removal of solvent therefrom yield latex particles in the colloidal size range, may contain a smaller proportion of particles of greater than precursor latex particle size. Such particles when relieved of their solvent end included in the latex product, do not appear to have much effect on the shelf life or storage stability of the latex, but do seem to act as initiators of coagulation when the latices containing them are subjected to mechanical working.

Accordingly, it is highly desireable that latices for uses in which they will be subjected to mechanical working be essentially free of such non-colloidal sized particles, and that such essential freedom be evidenced by the ability of the latex to pass a standardized mechanical stability test. Any of several such standardized tests may be employed, but the test preferred and referred to in the present specification is made as follows:

(a) A 50 gram sample of 20% solids latex is placed in a 300 ml tall form beaker (Pyrex No. 1040) and agitated for 30 minutes with a Hamilton Beach mixer (Model No. 930).

(b) The so agitated latex is then poured through a 200 mesh stainless steel screen and any retained coagulum is washed with water, dried at 105° C. and weighed.

(c) A mechanically stable latex should yield by this test less than 5% of its solid content as coagulum, and preferably essentially no coagulum.

The improvements of the present invention provide methods and means facilitating the production of such mechanically stable latices, including inter alia, severally and interdependently (1) the provision of an improved continuous emulsification system for more readily attaining desired or ideal conditions, or a close approximation thereof, e.g. for producing an aqueous emulsion of polymer-solvent cement essentially free of cement droplets of greater than precursor latex particle size; (2) the provision of a method and means for insuring the production of such mechanically stable latices from aqueous emulsions of solvent polymer cements notwithstanding less than ideal preparation of the initial aqueous emulsion of solvent/polymer cement, by a treatment which differentiates the susceptibility of the colloidal sized and non-colloidal sized resulting particles to heat, and then applies heat and mechanical treatment thereto in a manner to selectively coagulate the particles of greater than colloidal size without undue coagulation of the colloidal sized particles, so that the latex will be essentially free of particles detrimental to its mechanical stability, and preferably with recovery and reuse of the so selectively agglomerated and removed polymer coagulum; (3) the adaptation of the second improvement, just discussed, for treating latices prepared from emulsions of solvent/polymer cements and having poor mechanical stability, to improve the mechanical stability thereof as measured by the aforesaid test; (4) the provision of apparatus for facilitating the practice of the aforesaid and other process improvements.

In a first embodiment of the invention the formation of a latex from an organic solvent dispersion of a composition of an organic solvent soluble or dispersible polymer is effected by a process of the type which comprises:

(1) providing a dispersion of the polymer composition, preferably one having a dry solids content within the range of 8 to 50% by weight, in an essentially water-immiscible volatile solvent which itself or as an azeotrope with water has a boiling point lower than that of water at atmospheric pressure, (2) adding water and emulsifier to said dispersion in proportions to form an emulsion having water as its continuum and emulsifying the same so that the discontinuous phase thereof is in particles at least principally of precursor latex particle size, such proportions preferably being in the range of 0.4 to 20% emulsifier by weight based on the polymer, and 0.4 to 2.5 parts by volume of water per part of cement, and the emulsification preferably being effected continuously by a novel sub-combination which can minimize recycle, or provide controlled recycle, as hereinafter set forth;

(3) stripping the solvent from the emulsion to form a latex, and (4) recovering the latex product, preferably after concentration thereof, and which comprises the further steps of:

(5) providing a moving flow of gas comprising steam as an initial continuous phase, (6) dispersing the said emulsion into the flow of steam as the initial continuous phase while subjecting the phases to a decrease of pressure and maintaining the temperature thereof below the limiting temperature for stability of the emulsion of particles of precursor latex particle size, thereby vaporizing solvent from the dispersed droplets and forming latex and vapor, this step preferably being conducted in a manner to maintain the said temperature in the upper portions of the range for stability of the emulsion and to avoid explosive release of the solvent from the aerosol particles while avoiding impact against solid surfaces at velocities apt to produce coagulum, as hereinafter set forth, and in this embodiment mechanical stability of the latex may further be assured by the combination in the process of the further steps of:

(7) subjecting the latex prepared by step (6) to an increase in temperature for a period of time only sufficient to destabilize, and permit coagulation and/or agglomeration from the latex of, particles of greater than colloidal size that may be present therein without such time period being sufficiently long to substantially effect coagulation and/or agglomeration of the latex particles of colloidal size, and (8) separating from the latex any coagulum formed, and (9) the concentration of the latex, referred to in step (4), preferably being effected by heating without vaporization followed by vaporization in the absence of heating, as hereinafter described.

In particular species of this first embodiment: step (7) may be practiced by passing the latex formed in step (6) in contact with a surface heated in the range of 212° to 260° F., preferably 225° to 245° F., for a sufficient time to effect the destabilization and coagulation of such particles of greater than colloidal size, (by the term "coagulation" is meant the enlargement of such particles to separable size by agglomeration with non-colloidal and/or colloidal sized latex particles with the aid of surfaces heated to the temperature range 212° F. to 260° F.), and this practice may be carried out in the presence or absence of solvent vapor produced in step (6). And in the several species of this first embodiment, the process preferably further includes the step of recycling the coagulum separated in step (8) to form part of the material employed in forming the emulsion in step (2), and preferably in this step the coagulated polymer is dissolved in solvent the same as that used in step (1) and the resulting solution is employed to form a part of the solvent dispersion of polymer composition produced in step (1). Also, in the several species of this first embodiment step (4) is preferably practiced by establishing a separating zone maintained at sub-atmospheric pressure, establishing a flow of latex through said separating zone, introducing into said separating zone the latex droplets and vapor produced by step (6) and impinging said droplets upon the flow of latex therein, withdrawing vapor from said separating zone, and withdrawing the combined latices from said separating zone, with or without other cooperating steps hereinafter disclosed, or disclosed in the aforesaid applications, e.g., when a very fine latex is being produced, and being altered in particle size by grafting as in 27 of FIG. 1 herein (or by treatments exemplified in FIGS. 7, 7A and 7B, hereinafter described).

And in addition to the above process improvements the invention provides new apparatus combinations permitting continuous operation of the above processes, or of processes disclosed in the aforesaid copending applications.

Thus, objects of the invention, severally and interdependently, are to provide new apparatus features and new combinations of steps, which contribute to produce an improved process and which enable the production of improved latices. Other objects and advantages of the invention will be apparent from the above general description and the following more particular descriptions of preferred embodiments thereof, which, however, are illustrative but not restrictive of the invention, the scope of which is more particularly pointed out in the appended claims.

By the term "latex" as used herein is meant an aqueous dispersion of fine particles of polymer composition and emulsifier material which latex may be of the non-creaming or creaming type depending on its intended use, the non-creaming types having essentially all of their suspended particles in the colloidal size range characterized by Brownian movement, i.e., in the size range of latices having good mechanical stability; and the polymer thereof may be selected, e.g., from the following types and combinations thereof:

(i) homopolymer,
(ii) interpolymer including block and graft, polymer,
(iii) hydrocarbon polymer,
(iv) polar polymer, (v) polymer composition comprising polymer material selected from (i) through (iv) above and compounding ingredients including reinforcing fillers and/or non-reinforcing fillers.

By the term "colloidal particle" or "colloid" as used herein is meant particles in the size range of 500 Å to 10,000 Å diameter, and by the term upper portion of the colloidal size range is meant particles in the size range of above 2,000 Å, preferably 3,000 to 5,000 Å, diameter.

By the term "precursor latex particle size" is meant a particle of polymer composition and solvent of such a size that when relieved of its solvent content the resulting particle is a colloidal particle as above defined.

By the term "greater than precursor latex particle size" is meant a particle of polymer composition and solvent which, when relieved of its solvent, yields particles of greater than colloidal size, which reduce the mechanical stability of the latex. Such particles are usually from 10 to 1,000 times as large as particles of precursor latex particle size.

By the term "resin" as used herein is meant those inflammable amorphous vegetable products of secretion or disintegration usually formed in special cavities of plants and such resins are generally insoluble in water and soluble in alcohol, fusible and of concoidal fracture and are usually oxidation or polymerization products of terpenes and the like.

By the term "synthetic resin" as used herein is meant organic oxidation, polymerization or condensation products not produced in nature but produced synthetically and having resin-like properties and which term does not include the synthetic rubbers. Synthetic resins include (1) the resinous polymers produced from unsaturated petroleum compounds by oxidation and/or polymerization such as resinous alpha-olefin polymers, (2) condensation resins such as the phenolic resins, the aminoplast resins, alkyd resins, glycerol-phthalate resins and the like; (3) the non-rubber-like resinous polymers produced by cyclizing, hydrogenating or halogenating unsaturated rubbery polymers such as cyclized polyisoprene, chlorinated polyisoprene and the like, (4) resins derived from coal tar chemicals such as the cumarone-indene resins; (5) resinous materials prepared from vinyl, vinylidene and vinylene monomers; (6) resinous copolymers prepared from vinyl, vinylidene and vinylene monomers with conjugated diene monomers such as the high styrene-butadiene resins; (7) resinous copolymers prepared from vinyl, vinylidene, and vinylene monomers including alpha-olefins such as the ethylene-vinyl acetate copolymers. As used herein the term "synthetic resins" is restricted to those synthetic resins which are soluble or dispersable in at least one solvent which is essentially water immiscible and which itself or as its azeotrope with water has a boiling point lower than that of water at atmospheric pressure.

By the term "polymer composition" is meant elastomers and other high polymers (molecular weights $10^3$ to $10^6$) and/or lower polymers (500–1000 molecular weight) and said term polymer composition encompasses polymer materials, grafted or ungrafted including the synthetic resins, natural resins, natural rubber and the synthetic rubbers, synthetic plastic materials, asphalts and asphaltenes of natural and synthetic origin and such polymers with and without compounding ingredients and combinations of the foregoing.

The terms "solvent/polymer composition" or "solvent/polymer cement" refer to polymer composition which has been dispersed or dissolved in at least one solvent which is essentially water immiscible and which itself, or as its azeotrope with water has a boiling point lower than that of water at atmospheric pressure.

In practicing the present invention conditions are created combinations of which render practical the production of aqueous latices from solvent dispersions of high polymer compositions. These conditions, inter alia, include, severally and in cooperating combinations:

(1) The use of particular solvents for the polymers which are essentially immiscible with water in liquid phase, and which have boiling points less than the boiling point of water at atmospheric pressure, or which form azeotropes with water which have boiling points less than the boiling point of water at atmospheric pressure. The solvents, for example, include the $C_3$ to $C_7$ acyclic hydrocarbon solvents, cyclehexane and methylcyclohexane, the $C_6$ to $C_9$ aromatic hydrocarbon solvents, and the less desirable halo-substituted $C_1$ to $C_5$ hydrocarbon solvents when required and combinations of two or more members of the foregoing groups. Preferred are such solvents which have boiling points higher than that of water but which form azeotropes with water that have boiling points lower than that of water, which preferred group comprises especially the aromatic solvents including toluene, the xylenes, ethyl benzene, cumene, etc.

(2) The formation of relatively high solids cements of the polymer composition and the solvent therefor selected as aforesaid, which cements preferably have viscosities of over 1000 centipoises and more preferably over 7,000 to 10,000 centipoises, and even over 10,000 to 20,000 centipoises, which high viscosities can be tolerated because of other cooperating steps of the process. The cements of emulsifiable viscosities in the preferred range of 7,000 to 10,000 centipoises generally comprise by weight at least 25% and preferably over 50% of solvent, depending on the polymer to which the invention is applied.

The Polymer Material (1) (See FIG. 1)

The new process is applicable to the preparation of latices from solvent solutions or dispersions of polymer materials which are essentially solvent soluble or dispersable and essentially water insoluble, including natural rubber and polymers of ethylenically unsaturated monomer material containing from 2 to 20 carbon atoms, preferably from 2 to 10 carbon atoms. It is especially applicable to those elastomers and plastomers which, with or without plasticiser, have the foregoing properties and properties adapting their latices for use as adhesives, binders, film forming materials, coating materials, etc. Examples of such elastomers and plastomers, illustrative but not restrictive of those to which the invention can be applied, are as follows: butyl rubber, chlorinated butyl rubber, polyisobutylene, polybutadiene, polyisoprene, polyethylene, polypropylene (including both amorphous and/or crystalline polypropylene), ethylene-propylene polymer, ethylene-propylene-diene terpolymer, ethylene-vinylidene monomer interpolymers (including ethylene-vinyl acetate copolymers), butadiene-ethylene copolymers, propylene-butene-1 copolymers, butadiene-styrene copolymer, nitrile rubbers (including butadiene-acrylonitrile and butadiene-methacrylonitrile copolymers), natural rubber, hydrocarbon resins, any of the foregoing polymers grafted with polar or other polymer grafts, as for example, those set forth in British Pat. No. 878,150 to Burke, published Sept. 27, 1961, and solvent soluble mixed plastomers and elastomers, e.g., butadiene-styrene terpolymers with styrene copolymer resins including graft polymers thereof, as for example, those set forth in Hayes U.S. Pat. No. 2,802,808. Particularly included are those polymers which are prepared in essentially water immiscible organic liquid, or under essentially anhydrous conditions, from unsaturated monomers having 2 to 20 carbon atoms. Thus, said polymer material includes graft polymer material, and said polymer material may be grafted, per se, or as a solvent solution or dispersion with monomer material including the monomer material set forth under such headings hereinafter, and polymerized with the aid of a catalyst including the free radical generating catalysts set forth under such headings hereinafter; and may have plasticizer material incorporated therewith.

Compounding Ingredients (3), (3a) (See FIG. 1)

The compounding ingredients which are especially contemplated in the present invention include the solid, particulate, compounding ingredients which are insoluble in the solvents (6), namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pages 278 to 345 of "Compounding Ingredients for Rubber" 3rd Edition (1961) published by Rubber World, New York, N.Y., herein incorporated by reference, and on pages 146 to 217 of "British Compounding Ingredients for Rubber" by Brian J. Wilson (1958) published by W. Heffer & Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Pat. No. 799,043 to Burke published July 30, 1958 and in Chapter 15 entitled "Reinforcement of Rubber by Organic Fillers" in the treatise "Reinforcement of Elastomers" edited by Gerard Kraus (1965) published by International Publishers, New York. N.Y., herein incorporated by reference.

Since the invention contemplates that the compounding ingredients, e.g. fillers etc., introduced from source 3 at 2 and 5 of FIG. 1 will be contained in the polymer particles of the latex product such compounding ingredients when particulate perforce are confined to sizes smaller than the latex particle size. Suitable sizes for such particulate compounding ingredients are preferably particles of 0.1 to 0.2 microns or less diameter.

The Emulsifiers (8), (8'), (8A) (See FIG. 1.)

The invention in its broader aspects is not dependent on the use of any particular emulsifier or combination of emulsifiers, and may be practiced with any selected emulsifier or emulsifier combination suitable for aqueously emulsifying the non-aqueous solvent solutions or dispersions of the polymer materials concerned, for which purpose the emulsifier or combination of emulsifiers must be water soluble or water dispersible. Emulsifiers capable of forming stable aqueous emulsions with polymers may be selected from the following subgroups:

(a) One or more anionic emulsifiers.
(b) One or more cationic emulsifiers.
(c) One or more nonionic emulsifiers.
(d) Combinations of anionic and nonionic emulsifiers.
(e) Combinations of cationic and nonionic emulsifiers.

The anionic, cationic and nonionic emulsifiers which are water soluble usually contain from 8 to 22 carbon atoms, when non-polymeric, but such limitation does not apply to those which are polymeric, where water solubility or dispersibility is the criterion. The polymeric emulsifiers are best employed in conjunction with non-polymeric emulsifiers.

Emulsifiers of the anionic, cationic, and nonionic types including in some instances those in polymeric forms are set forth in "Detergents and Emulsifiers 1967 Annual" by John W. McCutcheon, published by John W. McCutcheon, Inc., Morristown, N.J., herein incorporated by reference and especially those listed therein under the headings of emulsifiers suitable for emulsion polymerization or suitable for the emulsification of polymer material, or suitable for the emulsification of hydrocarbons including hydrocarbon waxes, may be used in practicing the present invention. The use of about 0.4–20 percent by weight of emulsifier material based on the polymer composition content of the polymer-solvent cement in practically all instances suffices and in most instances 5 to 6 or less percent by weight of emulsifier based on polymer composition content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and water soluble and dispersable emulsifiers having the general formula: $R(OCH_2CH_2)_nOSO_3X$ wherein R is an aliphatic, aryl, alkaryl or cyclic radical, n is 1 to 9, and X is a monovalent alkali metal or ammonium radical.

Typical anionic emulsifiers are set forth in Table A.

TABLE A

| | Typical Anionic Emulsifiers | | |
|---|---|---|---|
| | Salt | Acid or Acid Radical | Trade Name |
| 1. | Potassium | hydroabietic and dehydroabietic | Dresinate 731 |
| 2. | Potassium | disproportionated tall oil rosin | Indusoil JC-11B |
| 3. | Sodium | hydrogenated tallow fatty acid | Armeen ET |
| 4. | Sodium | lauryl sulfate | Sipex UB Dupanol WAQ |
| 5. | Sodium | tallow sulfate | Conco Sulfate T |
| 6. | Ammonium | mononaphthalene sulfonic acid | Lomar PWA |
| 7. | Sodium | dodecylbenzene sulfate | Santooeree 85B |
| 8. | Sodium | polymerized alkyl napthalene sulfonic acid | Daxed 15 Daxed 23 |
| 9. | Sodium | alkyl aryl sulfonate | Nacconol 90F Sufranin OBS |
| 10. | Sodium | alkynapthalene sulfonate | Nekal BA-75 |
| 11. | Sodium | N-cyclohexyl-N-palmiteyl-taurate | Igepon CN-42 |
| 12. | Sodium | lauryl ether sulfate | Sipon ES |
| 13. | Sodium | alkylaryl | Triton W-30 |

TABLE A-continued
Typical Anionic Emulsifiers

| | Salt | Acid or Acid Radical | Trade Name |
|---|---|---|---|
| 14. | Sodium | polyether sulfate sulfate ester of nonylphenoxypoly(ethyleneoxy)ethanol | Alipal CO-433 |
| 15. | Ammonium | sulfate ester of nonylphenoxypoly(ethyleneoxy)ethanol | Alipal CO-436 |
| 16. | Sodium | naphthalene sulfonic acid | Nacconol NRSF |
| 17. | Sodium | dioctyl ester of sulfosuccinic acid | Aerosol OT |
| 18. | Sodium | saponified poly(methylvinylether/maleic anhydride) | Gantex AN-139 |
| 19. | Sodium | saponified poly(styrene/maleic anyhydride) | Lytron SMA-3000A |

The cationic emulsifiers include, but are not limited to, the class of emulsifiers which are acid salts of primary, secondary, and tertiary amines and the quanternary ammonium type emulsifiers. Typical cationic emulsifiers (used with acids to form water soluble salts when not quanternary ammonium compounds) are set forth in Table B.

TABLE B
Typical Cationic Emulsifiers

| | Emulsifier Base | Trade Name |
|---|---|---|
| 1. | Cocoamine | Armeen C |
| 2. | Stearylamine | Armeen T |
| 3. | N-alkyl trimethylene diamines (alkyl groups derived from cocoanut, soya, and tallow fatty acids) | Duomeen C Duomeen T |
| 4. | Primary fatty amine ethylene oxide reaction products, e.g. RNH(CH$_2$CH$_2$O)$_{25}$H | Priminox T-25 |
| 5. | Polyoxyethylated alkylamine | Katapol PN-430 |
| 6. | Ethylene oxide condensates with primary fatty amines | Ethomeens |
| 7. | bis(2-hydroxyethyl)cocoamine oxide | Armox C/12W |
| 8. | bis(2-hydroxyethyl)tallow amine oxide | Armox T/12 |
| 9. | Amine and quaternary ammonium compounds suitable as asphalt emulsifiers | Redicote Series e.g. Redicote E-4, E-5, E-9, E-12 and E-N. |
| 10. | C$_{18}$H$_{37}$N(CH$_3$)$_2$ClC$_3$H$_6$N(CH$_3$)$_3$Cl | Redicote E-11 |
| 11. | di-isobutyl phenoxy ethoxy ethyl dimethyl ammonium chloride | Hyamine 1622 |
| 12. | N-alkyl trimethylammonium chloride (alkyl = coco or steryl radical) | Arquads |
| 13. | polyvinylpyrrolidone | PVP |
| 14. | The imidazolenes | Varine T |
| 15. | Quaternaized imidazolenes | Monaquat CIBC |

Non-ionic emulsifiers can be selected from the class of emulsifiers which are alkyl polyoxyethylene ethers and alcohols, or polyethylene ethers and alcohols. Other non-ionic emulsifiers include those which are polyoxyalkenated alkyl phenols or alcohols having the formula R(OCHR$_1$CER$_1$)$_n$OH where R is an alkyl, aryl or alkaryl group, R$_1$ is an alkyl group or hydrogen and n is an integer of 4 to 10 or even higher. Compounds of this type are prepared by condensing an alkyl phenol or an alcohol with ethylene oxide or propylene oxide. Typical nonionic emulsifiers are set forth in Table C.

TABLE C
Typical nonionic Emulsifiers

| | Chemical Name | Trade Name |
|---|---|---|
| 1. | Nonylphenoxypoly(ethyleneoxy)ethanol | Igepal CO-970 |
| 2. | nonylphenyl polyethylene glycol ether | Tergitol TP-9 |
| 3. | polyethyleneglycol fatty ester | Modecol L. |
| 4. | coconut alkanolamide | Monamine AA-100 |
| 5. | polyethyleneglycol 400 monolaurate | Pagmol-5942 |
| 6. | propyleneglycol monolaurate | — |
| 7. | castordiethanolamide | Emid-6547 |
| 8. | ethylene oxide condensate with primary fatty amides | Ethomids |
| 9. | fatty alcohol polyglycolether | Lorox |
| 10. | sorbitolsesquioleate | Monion OP-83 |
| 11. | polyoxyethylene lauryl ether | Brij-35 |
| 12. | polyoxyethylene lauryl alcohol | Igepal-430 |
| 13. | polyetherated fatty alcohols | Emulphor-CN Emulphor-CN-870 |
| 14. | polyoxyethylated octyl phenol having 8 to 10 ethylene oxide units | Triton X-100 |

The Polymeric Emulsifiers include the water dispersible polyelectrolytes set forth in Hodrick and Mowry's U.S. Pat. No. 2,625,529 relating to "Methods of Conditioning Soils." In said patent are listed a number of water-soluble polyelectrolytes and these materials are defined as "synthetic water soluble polyelectrolytes having a weight average molecular weight of at least 10,000 and having a structure derived by the polymerization of at least one monoolefinic compound though the aliphatic unsaturated group and substantially free of cross-linking." The present invention has shown that these synthetic water soluble polyelectrolytes can be employed as emulsifiers for the preparation of latices as herein set forth. The disclosed polyelectrolytes of this patent are therefor incorporated herein by reference, it being noted however that the lower limit of molecular weight prescribed by the patentee does not apply, the applicable criterion being that the materials are water soluble or water dispersible emulsifiers.

Combination of emulsifiers. The present invention has disclosed that by using certain combinations of emulsifiers, it becomes possible to prepare a stable latex from aliphatic hydrocarbon polymers dissolved in hydrocarbon solvents and even in aromatic solvents, as is desirable under certain processing conditions. An effective emulsifier combination for aqueously emulsifying 100 parts by weight of a hydrocarbon rubber dissolved in from about 300 to 600 parts of an aromatic hydrocarbon solvent such as toluene, may comprise 10 parts by weight of a nonionic emulsifier, e.g. polyoxyethylated octyl phenol such as Triton X-100, a trade mark product and one part by weight of an anionic emulsifier, e.g. sodium lauryl sulfate.

Another effective emulsifier combination for 100 parts by weight of hydrocarbon rubber dissolved in about 400 parts of aromatic solvent such as toluene combines 3 parts by weight of the aryl anionic emulsifier, sodium salt of an alkaryl polyether sulfate e.g. Triton W-30 (a trade mark. product) and 3 parts by weight of the non-aryl anionic emulsifier sodium lauryl sulfate e.g. Dupanol WAQ (a trade mark product).

It has for some time been a desideratum in the art to have a stable hydrocarbon rubber latex suitable for combination with asphalt or asphalt emulsions, for road surfacing and roofing purposes, for example, U.S. Pat.

No. 3,652,482 incorporated herein by reference has disclosed that latices of hydrocarbon rubber such as butyl rubber, polyisobutylene, ethylene-propylene rubber or rubbery amorphous polypropylene, which are suitable for such use, can be prepared by employing as emulsifier for the hydrocarbon solvent solution of the rubber a combination of emulsifiers in which one or more quaternary ammonium emulsifiers (e.g. the quaternary ammonium compounds supplied under the Redicote trade mark), are combined with one or more fatty acid amine or diamine typ emulsifiers in the ratio of quaternary ammonium to fatty acid amine in the range of from 1:5 to 5:1, notwithstanding that the quaternary ammonium emulsifiers alone, for the most part, will not form stable aqueous emulsions with the above types of hydrocarbon polymers.

For example a stable aqueous latex is obtained from hydrocarbon rubber e.g. butyl rubber or ethylene-propylene rubber, dissolved in an aliphatic or even an aromatic solvent, e.g. hexane, benzene, toluene and/or the zylenes, with the aid of a mixture of the emulsifiers selected from subgroups (a) and (b) in the ratio of 0.5:5 to 5:0.5 parts by weight, said mixture being employed in the amount of 2 to 10 parts by weight based on the polymer, and said sub-groups (a) and (b) being represented by formulae I and II respectively:

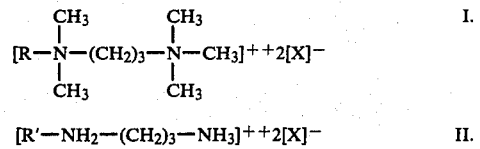

wherein R and R' are selected from the alkyl radicals having from 8 to 22 carbon atoms and X is an acid anion, preferably the alkyl radicals being those derived from coconut oil and/or tallow fatty acids.

The quantity of emulsifier employed in this invention is in the range of 2% to 20% by weight and preferably 4% to 12% by weight based on the high polymer composition; and if desired, small additions of electrolyte may be made to the latex or in preparing the course or fine emulsion, as, for example, in accordance with the practices referred to in U.S. Pat. Nos. 2,955,094 issued Oct. 4, 1960 and 3,222,311, issued Dec. 4, 1965, to Esso Research and Engineering Company, as assignee of R. S. Brodkey et al and A. L. Miller et al. Alkali metal acid phosphate salts are suitable for this purpose, and are also useful in connection with the use of the additiuent 24d (FIG. 1) as above described, for reducing the quantity of said additiuent required.

Monomer Materials (24b) (See FIG. 1)

The ethylenically unsaturated monomer material employable herein is selected from the class consisting of:
(i) the mono-ethylenically unsaturated aromatic hydrocarbon monomers containing from 8 to 18 carbon atoms,
(ii) the conjugated diene hydrocarbon monomers containing not more than 12 carbon atoms,
(iii) the non-conjugated diene hydrocarbon monomers containing not more than 18 carbon atoms,
(iv) the mono-ethylenically unsaturated monomers containing polar groups and having not more than 18 carbon atoms, and
(v) the non-conjugated diene and triene monomers containing polar groups and having not more than 22 carbon atoms, the polar groups of (iv) and (v) being selected from the class consisting of carboxyl, hydroxyl, carbonyl, ester, ether, nitrile, amine, quaternary ammonium, amide, triazine, halogen, and sulfur or phosphorous containing groups.

Examples of the respective groups of monomers comprised in the above class are set forth in my U.S. Pat. No. 3,644,263 herein incorporated by reference.

Free-Radical Generating Polymerization Catalysts (24a) (See FIG. 1)

The free-radical generating catalysts and catalyst system useful in the range of 0.8 to 20 parts per 100 parts of added monomer materials employed in certain embodiments of the present invention constitute a well-known class (set forth in my U.S. Pat. No. 3,644,263) which includes: the inorganic peroxides such as hydrogen peroxide and the like; the various organic peroxy catalysts, such as the dialkyl peroxides, e.g. diethyl peroxide, diisopropyl peroxide, dilauryl peroxide, diolelyl peroxide, distearyl peroxide, di-(tertiary-butyl) peroxide, di-(tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, and diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxide such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis (isobutyronitrile), 2-azobis (2-methylbutyronitrile) 1-azobis (1-cyclohexancarbonitrile) and the like, and other free radical generating catalysts employable in emulsion polymerization, such as peroxy-catalyst compounds in combination with a reducing compound such as an amine, e.g. triethylene tetramine or tetraethylene pentamine, with or without metallic ion combination, e.g., ferrous ions, which systems are referred to as "redox" free-radical generating catalyst systems, which latter are further exemplified in the treatise "Emulsion Polymerization" by F. A. Bovey, et al, 1955 Interscience Publishers, Inc., New York, New York, herein incorporated by reference especially pages 71–73.

Cross-linking Agents (24c) (See FIG. 1)

The cross-linking agents useful, in the range of 0.1 to 20 parts per 100 parts of polymer content of the later by weight, for effecting the cross-linking employed in particular embodiments of the present invention, also form a well-known class of materials which includes: elemental sulfur, selenium and tellurium, and compounds containing these elements, usually in their lower valence states or covalence states, and other polyfunctional free radical generating catalysts. Compounds which liberate sulfur, selenium or tellurium during irradiation or during heat aging (100° to 200° C.) are useful. Polymers containing sulfur, selenium or tellurium and/or monomers capable of forming such polymers are also useful. Conventional rubber vulcanizing agents and vulcanizing accelerators are particularly adapted to this application. Specific compounds of the class are: The mercapt thiazoles, such as 2-mercaptobenzothiozole and its salts, for example its zinc salt, thiuram sulfides, such as tetraethylthiuram monosulfide and tetrabutylthiuram monosulfide; guanidines, thiourea, substituted thioureas, thiocarbanilides, substituted thiocarbanilides such as o-dimethylthiocarbanilide and its isomers and alkyl homologs; zinc dialkyl dithiocarbamtes such as zinc dimethyl dithiocarbamate, zinc diethyldithiocarbamate, zinc dibutyl dithiocarbamate, and zinc dibenzyl dithiocarbamate or accelerators containing these materials, thiurams such as tetramethylthiuram disulfide, tetramethylthiuram disulfide, and other tetra substituted thiuram disulfides; solenium dialkyl dithiocarbamates such as salonium diethyldithiocarbamate; 2-benzothiazyl-N,K-diethylthiocarbamyl sulfide; sodium or potassium dimethyl-dithiocarbamate, xanthates such as dibutyl zanthogen disulfide and Naugatuck Chemical's CPB and ZBX; alkyl phenol sulfides; bis(dimethylthiocarbamyl) disulfide, dipentamethylene tetrasulfide; and sulfur containing polymers such as Thickol VA-3, 4,4-dithiomorpholine and disulfides such as benzothiazyl disulfide. In fact, any compound in which sulfur, selenium or tellurium is attached only to an atom of carbon, hydrogen, nitrogen or to another sulfur, selenium or tellurium atom, as the case may be, may be suitable.

Also included in the class are the sulfonyl hydrazides and disulfonyl hydrazides. The latter are particularly useful since they contain two widely separated sulfur-bearing moieties capable of forming sulfur cross-links or free radical derived cross-linkages (as a result of thermal loss of nitrogen). Blowing agents such as p,p'-oxybis (benzene sulfonyl hydride), p,p'-diphenyl bis(sulfonyl hydrazide) and m-benzene-bis(sulfonyl hydrazide) are examples of additives which can also be employed as cross-linking agents.

Included in the class are the cross-linking azo compounds, e.g. di-cyano-azo-butane; and the like.

Included in the class are also the peroxy compounds such as bis($\alpha$-,$\alpha$-dimethyl-dicumy) peroxide (dicumyl peroxide), 1,3-bis($\alpha$-, t.butylperoxypropyl) benzene, 2,5-bis(t.butylperoxy)-2,5-dimethylhexane, 2,5-dimethyl-2,5-di(t.butylperoxy)hexyne-3, di($\alpha$-, $\alpha$-dimethyl-p-chlorobenzyl)peroxide, di($\alpha$-,$\alpha$-dimethyl-2,4-dichlorobenzyl peroxide, di($\alpha$-,$\alpha$-dimethyl-naphthyl)peroxide and the like.

Further included in the class are combinations of the above said peroxy compounds and the above said sulfur, selenium and tellurium compounds.

Ionizing Radiation

The ionizing radiation employed in certain embodiments of the present invention is of a type known to those skilled in the art, viz: it is radiation with sufficient energy to remove an electron from an atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above may be used in lieu of polymerization catalyst. Such ionizing radiation is generally classed in two types; high energy particle radiation, and ionizing electromagnetic radiation. The effect produced by these two types of radiation is similar, the essential requisite being that the incident photons have sufficient energy to break chemical bonds and generate free radicals.

The preferred radiation for the practice of the said embodiments of this invention is high energy ionizing radiation, and has an energy equivalent to at least 0.1 million electron volt (mev.). Higher energies are even more effective; there is no known upper limit, except that imposed by available equipment and the product stability.

When irradiation is employed in the present invention, it is preferably effected at about atmospheric pressure and at temperature between about 5° and 95° C., a temperature of about 25°–65° C. being preferred.

As is well known in the irradiation grafting of solid substrates, the optimum dose of irradiation varies with the particular materials concerned, a dose of about 5,000 rads (0.005 mrad) being required for significant grafting. Dosages and dosage rates may be selected between the limits which with given latices and under the conditions concerned are sufficient to not require excessive time of treatment and those not so high as to cause excessive rise of temperature, e.g., above 95° C., or excessive decomposition of materials concerned. Such limits are well understood by those skilled in the irradiation art, and are readily determined for particular materials by simple tests as above indicated.

BRIEF DESCRIPTION OF THE DRAWINGS

FIG. 1 is a flow sheet or diagram illustrating the sequence of steps and flow of material in typical embodiments of process.

FIGS. 2, 2A, 2B and 2C are diagrams of several forms of equipment for preparing the emulsion, corresponding to portions 7–13 of FIG. 1, the corresponding elements having generally the same terminal numerals as in FIG. 1, and respective parts thereof being designated by priming or modifying letters.

FIG. 3 is a similar diagram of preferred and other forms of device for dispersing the emulsion of solvent/polymer cement into the steam flow, separating the latex phase from the vapor phase, and further treating the latex phase, corresponding to portions 14 and following of FIG. 1.

FIGS. 3A, 3B, 3C and 3D are diagrammatic plan views in greater detail of portions of apparatus corresponding to various portions of FIG. 3.

FIG. 4 is a more or less diagrammatic elevation partly cut away of a suitable embodiment of the portion 14 of FIG. 1.

FIG. 5 is a more or less diagrammatic elevation, partly cut away, of a suitable form of separator corresponding to portion 16 of FIG. 1.

FIG. 6 is a more or less diagrammatic horizontal cross-section taken on the line 6—6 of FIG. 5.

FIGS. 7, and 7A and 7B are simplified diagrams of overall systems of apparatus embodying the invention.

FIGS. 12 to 15 are vertical elevations partly cut away of types of mixer nozzles or in-line mixers employable as aerosol generators and/or mixers in the practice of the invention, e.g. in FIGS. 7, 7A, 7B and 8 to 11.

FIG. 16 is a more or less diagrammatic elevation of another embodiment.

FIG. 17 is a more or less diagrammatic elevation partly cut away of an arrangement comprising a solvent cement aqueous emulsion homogenizer delivering its output directly to an aerosol generator.

DESCRIPTION OF PREFERRED EMBODIMENTS

In General

Figure 3A:
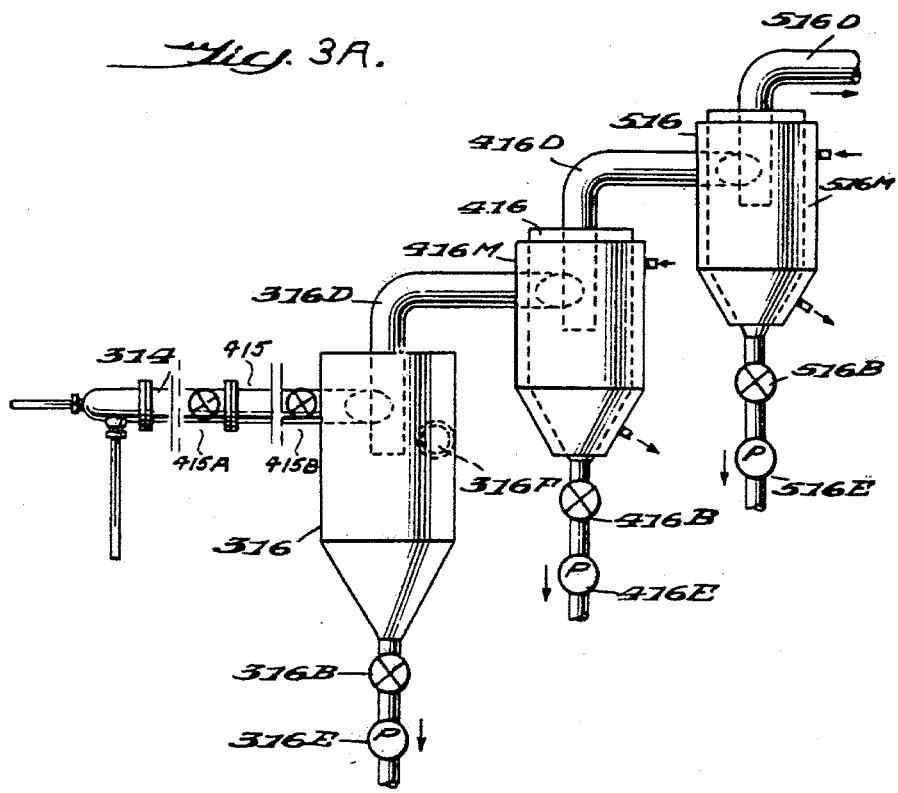

In preferred embodiments as illustrated in FIG. 1, the polymer material (1), e.g., elastomer and/or plastomer material as hereinbefore described, is prepared as a polymer composition (4) for conversion to a cement, as by working in appropriate masticating, comminuting, or attenuating equipment (2), such as a rubber mill, Banbury, comminutor, extruder, or the like. In accordance with the aforesaid applications provision may be made for incorporating one or more known polymer compounding ingredients (3), e.g, rubber reinforcing filler, into the said polymer composition in such a way that the ingredients (3) are thereafter contained within the polymer particles of the latex being formed, for which purpose the said ingredient or ingredients (3) may be worked into the polymer material (1) by working therewith in the masticating equipment (2), providing such polymer composition will, when dispersed in a suitable solvent for the polymer and with the aid of an emulsifying agent and adequate emulsifying equipment, produce an aqueous dispersion that is essentially of precursor latex particle size. By such procedure the said polymer ingredients may become fixed to the compounding ingredient, i.e., the polymer particles can become reinforced by the fillers, and in effect become so intimately attached thereto, or embrasive thereof, as to retain the same when dispersed as a cement. In the case of compounding ingredients desired to be incorporated in the latex particles, but not requiring working with the polymer itself, such ingredients (3) may be fed into the cement forming equipment or dissolver (5) independently of the said polymer composition (4), as is also indicated in FIG. 1.

In the cement forming equipment or mixer or dissolver (5) which may also comprise a disperser, the polymer composition (4) is combined and preferably mixed or otherwise worked with solvent (6) appropriate for the polymer composition and for the process, as further described herein, to form a solvent cement (7) of the polymer composition (4) and of any extraneously added compounding ingredients (3), the adequate dispersion of which in the cement may require vigorous working, which may even be accomplished by the passage of the cement through a suitable dispersing equipment **(7*a*)**.

The solvent/polymer composition (7) is then combined with emulsifier (8) appropriate for the polymer and the process, and with water (9) in a coarse emulsion mixing equipment (10) where the ingredients are mixed, preferably with the aid of heat, to form a coarse cement in water emulsion (11), which is then passed one or more times through an ultradispersing equipment (12), preferably of the type hereinafter illustrated in FIGS. 2, 2A or 2B, which breaks up the relatively large particles of solvent/polymer composition forming the discontinuous phase in the coarse emulsion (11) into a fine emulsion with the ultra dispersing equipment (12) and homogenizing means (13E) and such fine emulsion particles should be of such small size that they will be of stable latex particle size when relieved of their solvent content and preferably near the upper limit of such size. The emulsion of high viscosity solvent/polymer composition prepared by the ultradisperser equipment (12), adjusted if necessary to an appropriate temperature, by the cooler 13A, bypass 13B and or heater 13C, is fed by suitable positive displacement, e.g., plunger pump means 13D, to a high-pressure homogenizer preferably of the resiliently restricted orifice type 13E for reducing the particle size of the fine emulsion. The resulting emulsion of reduced particle size is preferably cooled by a cooler 13F before being delivered to storage means such as a tank 13, for subsequent treatment as indicated in FIG. 1. The emulsifier material (8) may be formed into an aqueous emulsifier solution (8′) with water (9′) saturated with solvent or with water (9″) from an extraneous source.

The resulting relatively cool fine cement-in-water emulsion of precursor latex size particles (13) as in the aforesaid applications it then converted into an aerosol in mixer (14) with the aid of steam from steam supply **(14*a*) and said dispersed phase may comprise colloidal and larger sized droplets in a steam/solvent vapor continuum, and in separator (16) with or without passing through segregator (15) is stripped of its solvent content without excessive foaming and while avoiding formation of coagulum. In accordance with the present invention provision is preferably made by which the temperature and pressure and the rate of evaporation of solvent from the aerosol droplets may be controlled to facilitate maintenance of the stability of the aqueous emulsion during the stripping of the solvent to produce an aerosol of latex of the polymer, as is hereinafter more fully described in connection with FIGS. 3 and 4. As in the aforesaid applications, the formation of the aerosol is preferably accomplished by providing a flow of steam (14*a*) as an initial continuous phase and introducing the oil-in-water emulsion of precursor latex sized particles (13) as a discontinuous phase into the flow of steam in a mixer (14) as the initial continuous phase, whereby volatile solvent (6) is vaporized to become the continuous phase or the principal part thereof, and a corresponding amount of steam is condensed to supply the heat of vaporization for the solvent and become added as water to the discontinuous phase. The final separation or collection may be attained by delivering the flow from the mixer (14) into a separator or collector (16), from the lower part of which the latex is drawn, and from an upper part of which the continuous vapor phase is passed to condensing equipment (17) maintained at a lower pressure than the separator-collector and preferably under vacuum, i.e., a vacuum of the order of 24 to 29 inches of mercury, by withdrawal of uncondensed gases therefrom by vacuum pumping equipment (18), e.g., a steam jet, and the separator of collector (16)** may be of various forms.

Still referring to FIG. 1, the polymer composition latex (19) withdrawn from the separator (16) may be delivered as product (24), or may be recycled as indicated at (21) and be again fed as discontinuous phase through the steam disperser (14); and/or through the separator (16) for aiding in recovery of the latex droplets from the aerosol as above noted, either separately or concurrently with additional emulsion (13) as is indicated by the valve symbols between (13) and (14) and in the lines from (16B) to (14) and from (16B) to (16) in FIG. 1, or it may be cycled through a different or the same heater and separator (21 and 16) for concentrating the latex, in which event the latex is heated to evaporate water therefrom under subatmospheric pressure at temperatures within the limited temperature range for its stability, externally to its flow path (in 21) from the valved heat source (21A). When such concentrating step has been employed the product (24) resulting therefrom will be a latex of increased solids content. The latex, which still may contain traces of residual solvent, may be mixed in a hold tank, mixer, or proportionate feeder 24 with polymerization catalyst 24a and monomer material 24b, and be fed as by pump (25A) into polymerization reactor (27) to partially or completely effect polymerization of the monomer materials in intimately associated or grafted form with the polymer, and in cases in which further treatment by subjection to heat energy or to the effect of high-energy radiation is required, to so complete the polymer modification to the desired degree. The modified polymer latex from reactor (27) is delivered to storage (29), preferably through a cooler (28), pending delivery as by a pump (30) for optional further treatment in heating and separating apparatus (31) and (32). The modified latex from pump (30) or separator (32) may be passed by a pump (34) to product storage (36), preferably through a cooler (35); or may be treated in high-pressure homogenizer (13E') to alter its average particle size and delivered to storage (36), as by pump 34'.

In certain embodiments of the invention, the operations up to point 24 may be conducted to form the cement and latex 24 of low molecular weight polymer, which enables a cement of higher solids content to be employed without having to deal with excessively high viscosity, and monomer 24b and catalyst 24a, and temperature in apparatus 27 may be employed in such quantities and degree as to materially augment the molecular weight of the polymer, and especially when it is desired to highly augment such molecular weight, polymer cross-linking agent 24c may be added in the mixer 24, for intimate association and reaction in apparatus 27.

Destabilization of the latex at 24 may be effected by adding a chemical destabilizing agent 24d, e.g., an acid or acid salt and preferably an acid or a weakly acidic volatile acid salt, which can be removed from the latex in the apparatus (31) and (32), or an acidic additive desired in the latex, as hereinbefore described, in a quantity less than that which would coagulate the latex, and the thus destabilized latex may be then treated in the high-pressure homogenizer (13E') to increase its average particle size as aforesaid. And in those embodiments of the invention in which the chemical destabilizer is not removable or removed from the latex (24') being delivered to storage (36), an alkali (24e), or additional emulsifier (9A), may be added to the latex of increased particle size (4), to restore said latex to a stable condition.

In FIG. 2 there is shown an arrangement of homogenizers to constitute a preferred cement emulsifying equipment. This arrangement is provided with optional facilities selectively employable by means of valves for continuous or batch operation, for single unit or tandem unit operation, and for selective, complete or partial recycle in each mode of operation, and it will of course be understood that where certain of these optional facilities are not desired they may be omitted without departing from the invention.

In this FIG. 2 arrangement the solvent and polymer dispersion 107 and the water and emulsifier solution 108' are adjusted in temperature by heat exchangers 110A and passed to the coarse emulsion mixer equipment. For batch operation, as shown, this equipment may be in the form of a hold tank 110 provided with an agitator. For continuous operation, as shown, it may be in the form of in-line mixing equipment 110B. The in-line mixer equipment 110B may also be employed to premix the materials being delivered to tank 110 for batch operation. The coarse emulsion in batch operation is passed from tank 110 under gravity head and/or pressure head contributed by pump 110C to the ultradispersing equipment 112 and/or 112A and/or 112B, or for continuous operation may be passed to the latter directly from the in-line mixer equipment 110B, and under the head developed thereby augmented, if desired, by the head developed by pump 110C. The coarse emulsion under pressure as aforesaid may be passed through any one or more of the ultradispersing equipments 112-112B and may be recycled therethrough either directly, or by way of the coarse emulsion tank 110. When the preparation of the emulsion of precursor latex sized particles have been completed this intermediate product may be delivered to storage 113j; preferably being cooled by means of a cooler 113F to assure maintenance of the emulsion even with minimum quantities of emulsifying agent present. As is indicated in FIG. 2, effective results have been attained by repeatedly passing the coarse emulsion through an equipment 112 of the perforated stator type shown in Mould, Jr. U.S. Pat. No. 3,195,867, and then through one or more equipments 112A and/or 112B in tandem with, and similar to, equipment 112 but provided with a slotted stator of the type illustrated in FIGS. 5 and 7 of Hager U.S. Pat. No. 3,194,540, with recycling from equipment 112A to the tank 110 and then by gravity head through equipments 112 and 112A, about a half dozen to a dozen times before delivery of the resulting product to the storage tank 113. During recycling, especially with sensitive emulsion prepared with a minimum of emulsifying agent, it is desirable to cool the emulsion which has been heated by working in the ultradispersing apparatus, by means of a heat exchanger in the recycle line, as at 112C.

After the emulsion has been reduced to emulsion of temporary precursor latex particle size, when this feature of the process is employed, a further amount of emulsifier may be contained therewith as shown at 113g in FIG. 2 by a simple mixing as in mixer M in the lines leading to 113F, without further homogenizing action that would further reduce the particle size of the dispersed phase. The emulsion of at least temporarily precursor latex particle size in the desired range may be fed, when stable or stabilized, to storage 113 or 113j, or, when only temporarily stable may be fed directly to the mixer or aerosol generator 114 of FIG. 3 via valved line 113h or valved line 113i.

As is further shown in FIG. 2, various types of homogenizer can be employed for forming the fine emulsion of cement at least temporarily of precursor latex particle size, e.g., a homogenizer of the colloid mill type 213, a homogenizer 313 of the vibrating blade type such as the liquid whistle or "Rapisonic", "Multisonic" and "Dispersonic" (trademarks) types (presently preferred when used as in FIG. 2B) or an emulsifier of the high pressure resiliently restricted orifice type 113D, 113E to which the emulsion effluent from the ultradispersers 112-112B is fed after adjusting, e.g., to temperatures of 140°-160° F. by the heat exchanger. The Gaulin type homogenizer comprises the pump 113D which is a plunger pump that develops from 1,000 to 10,000 p.s.i. depending on the resilient load applied to the valve head means thus resiliently restricting the emulsifying orifice or valve-opening means of the device. This load can be adjusted in the commercial devices by means of a hand wheel, shown at the entrance end of the homogenizer 113E. The output from the unit 113E may be delivered to cooler 113F and thence to storage 113j, or via 113h, or may be stored in tank 113 when recycling through the homogenizer circuit 113D-113E is desired.

Similarly, various types of ultradispersing equipment may be employed for preforming the first emulsifying step, two of which have been illustrated at 112 and 112A-112B respectively. Among the suitable commercially available equipment which may be employed in lieu of or in combination with the illustrated Mould or Hager type equipment, are, for example, the Gifford-Wood types of high speed, high shear homogenizer-mixers for in-line installation (pipeline mixers) such as the tandem-shear pipe line mixer (a dual tandem shear mixing head incorporating two turbines and two stators in tandem on a single shaft), or the tandem mixer refiner (a combination homogenizer-turbine/stator and a fixed-gap colloidal millhead operating on a single shaft), or the like.

FIG. 2A provides a first emulsifying step similar to FIG. 2, however, in the second emulsifying step two or more high pressure submicron homogenizers 113D and 113D' are employed with valving so that all of the product passes through each of the two or more high pressure homogenizers with or without partial recycle of the product stream as via adjustable valves 120A and/or 120A' from the outlet to the inlet of one or more of the high pressure homogenizers. The product from the plurality of high pressure submicron restricted orifice type homogenizers preferably passes to storage 113j via cooler 113F and thence to separating means exemplified in FIG. 3, commencing with mixer 114. With this arrangement an upstream homogenizer 113D must be operated to discharge a sufficient quantity of emulsion to supply the positive displacement pump of the next downstream homogenizer 113D', and as a practical matter it is therefore necessary that the upstream unit 113D deliver more emulsion than is required to feed the next downstream homogenizer 113D' and that the excess be discharged, e.g., by adjusting the speeds of the variable speed pump motors 113M and 113M' and recycling the excess via the pressure relief valve 120 or via the opening of recycle control valve 120A when recycling in the upstream unit. When recycle is to be practiced in the most downstream homogenizer 113D', said unit is provided with a recycle control valve 120A' and a back pressure maintaining valve 120B, and also as a safety measure with a relief valve 120'.

In FIG. 2B is illustrated a preferred arrangement of homogenizers to constitute a continuous emulsifying system for forming a coarse aqueous emulsion of a solvent/polymer composition and converting the same to a fine emulsion of which substantially all of the emulsified cement droplets forming the discontinuous phase are of precursor latex particle size. This system in the form shown comprises (1) a plurality of in-line mechanical homogenizers connected in series with or without recycle for forming the coarse emulsion, and (2) a set of homogenizing units each comprising an inlet and an outlet chamber with a restricted orifice therebetween, connected in series and sufficient in number to effect the conversion in a single pass of the so formed emulsion therethrough, said set being provided with means enabling such set of homogenizers to be operated essentially without holdup or storage between the homogenizers of the set and without or with controlled recycle when a very uniform size, or a controlled distribution of sizes, respectively, of the particles in the precursor latex size range is desired. This system, when operated without recycle, insures that essentially all of the product passes in essentially the same manner through all of the homogenizing units, minimizes agglomeration of the emulsion particles between emulsification steps, and permits use of relatively high temperatures without thermal agglomeration of the particles because of shorter emulsification times prior to cooling.

In FIG. 2B the solvent/polymer composition dispersion is supplied through 107 and the aqueous emulsifier solution through 108. With the aid of valves 107A, 107B and 107C these solutions are charged alternately to mixer tanks 110 or 110' in which they are mixed to form a crude emulsion. The streams 107 and 108 may be adjusted to the desired temperatures through heat exchangers (as indicated at 110A and 110A' in FIG. 2A). By employing valves 109A and 109B crude emulsion formed in 110 and 110', respectively, is fed by gravity (or by a pump as indicated at 110C in FIG. 2A) to the coarse emulsion forming means 312, 312', etc., made up of in-line homogenizers such as those described in more detail in connection with FIG. 2. Alternatively, the feed flows 107 and 108 can be fed directly to the homogenizer 312, as by closing valves 107A and 107C and opening valves 107B and 107D, without preforming a crude emulsion. The homogenizers 312, 312', etc., are connected in series, with the effluent from each upstream unit feeding the next downstream unit. Valves 109C, 109D and 109E may be provided to permit recycling of the product from the outlet to the inlet of one or more of the homogenizers of the coarse emulsion forming means.

Still referring to FIG. 2B, the coarse emulsion from homogenizer 312" is passed to the equipment for converting it to a fine emulsion, via surge tank 515 in which the level may be controlled by float valve means 513-514. The means for converting the coarse emulsion to a fine emulsion in which substantially all of the emulsified cement droplets forming the discontinuous phase are of precursor latex particle size, comprises a sufficient number of homogenizing units in series to effect such conversion in a single pass therethrough, said homogenizing units each having an inlet and an outlet chamber with a restricted orifice therebetween and pressure raising means between its inlet and its restricted orifice.

The flow of coarse emulsion from surge tank 515 is passed to the pressure raising means of the first of said plurality of homogenizing units, i.e., to pump 501 which, with the aid of a relief valve 501A and gas cushion or like damping means 508A, if necessary, provides a relatively nonpulsating supply of emulsion in the range of about 100 to 1000 psi preferably in the range of about 300-500 psi. The plurality of homogenizing units of the set are connected seriatim in multi-stage arrangement so that the completeness of the emulsion is increased progressively as it passes downstream therethrough, by virtue of its having been subjected to pressure elevation and pressure drop successively through the orifices of said units. The temperature of the flow is maintained at values which are both below the maximum temperature for stability of the emulsion and within the range in which the viscosity of the cement is below the maximum viscosity which can be emulsified by said homogenizing units. In the system of FIG. 2B means is provided for maintaining predetermined pressure drops across the orifices of the several homogenizing units 313, 313', etc., by (1) adding to the flow between adjacent units, when necessary, minor proportions of finer emulsion, preferably from the flow being discharged via line 521 from the most downstream of said units, via check valves 510, 510', etc., and (2) removing from the flow between adjacent units, when necessary, minor proportions of the emulsion thereat, as by relief valves 507, 507', etc., connected to the inlets to the pressure raising means 501', 501", etc., as shown, which may be set to relieve excess fluid at selected pressure greater than that in line 521, and each unit of the series is provided with elements corresponding to relief valve 501A, damping means 508A and pressure gauge 508, designated by the same reference numerals appropriately primed.

The flow between adjacent homogenizing units is maintained by (1) removing from adjacent units, when necessary, minor proportions of emulsion or by (2) adding to the flow between adjacent units when necessary, minor proportions of fine emulsion from the discharge from a homogenizing unit downstream thereof and preferably from a homogenizing unit most downstream thereof as described above. Thus the flow between homogenizing units 313 and 313' may require added emulsion because the feed to homogenizing unit 313' requires more emulsion than is fed to homogenizing unit 313, and in such instance valve 530 may be totally or partially closed and valve 530' may be opened so that the added emulsion requirement between units 313 and 313' is supplied from the outlet of unit 313' with or without emulsion from a unit further downstream thereof and such emulsion is supplied through check valve 530", 530', line 521 and check valve 510 to the inlet of pump 501' and homogenizing unit 313'.

The pressure raising means 501, 501', etc., for the respective units, may comprise any pump suitable to supply the aqueous liquid feed to the liquid whistle, e.g., a positive displacement pump such as a triplex piston pump or a series of Moyno type pumps. The sonic effect in the liquid whistle is produced by passing the emulsified feed under pressure through the restricted orifice which may be elliptical, thus producing a shaped jet of feed to impinge on the knife edge of the reed or blade which is supported by an assembly in an outlet or cavitation chamber designed to confine the ultrasonic energy. Depending on the design of the chamber containing the blade, the blade characteristics, and the orifice size and shape, certain pressures are required to cause the fluid to resonate, i.e., when the emulsion pressure upstream from the orifice is 300–500 psi the chamber pressure downstream of the orifice will be adjusted, e.g., to 30–50 psi, to obtain maximum ultrasonic whistle energy, which occurs when the velocity of the fluid impinging on the vibrating blade reaches the point at which the sonic frequency including harmonics becomes equal to the natural resonant frequency of the blade.

The input pressure levels to the orifices of the liquid whistles, observed on pressure gauges 508, 508', etc., are preferably set by adjusting the pumping rates thereto, and by setting the relief valves 501A, 501A', etc., to open at slightly greater pressure.

The outlet chamber pressures in the liquid whistle blade cavities are measured by pressure gauges 509, 509', etc., and controlled by valves 503, 503', etc., and relief valves 504, 504', etc., are provided to relieve any excess pressures therein. It is usually preferred not to recycle the product, so that it will have maximum uniformity of particle size. However, if recycle is desired then the output of one or more of the liquid whistles may be recycled back to the pump input thereof, or to the most upstream unit, and this recycle may be controlled by valves 520, 520', etc. (Any excess of recycle in the unit being released by relief valves 507, 507', etc.) and/or by valves 520A, 520A', etc., leading to return line 523. As above noted, if the output of any unit via 503, 503', etc., fails to supply sufficient feed to the input of the next downstream unit, then finished emulsion from the most downstream unit, e.g., 313", may be fed via line 521 to make up the insufficiency through check valves 510, 510', etc., and relief valves 507, 507', etc., are set at a pressure higher than that in product line 521.

If any unit delivers via 503, 503', etc., a quantity of emulsion exceeding the input capacity of the next downstream unit, the excess is bled off through relief means, e.g., valves 507, 507', etc. By proper adjustment this bleed off is preferably eliminated or minimized. Any emulsion so released from between stages or units is preferably returned to the input to the most upstream unit via line 523. When the relief means comprises relief valves 507, etc., the return may be delivered, as via valve 522, to the input to pump 501 and/or to surge tank 515. When the same pressure is to be maintained in the inputs to each unit, then the several relief valves 507, 507', etc., may be closed or eliminated and a single relief valve 518, connected directly to the inputs to the units through check valves 527, 527', etc. may be employed, set to a pressure greater than that in line 521, and valve 522 will then be closed.

For conversion from one pressure relief system to the other stop valves 507A, 507A', etc., and 525, 525', etc. may be provided. In like fashion, in lieu of the single relief valve 518 a standpipe 516 with pressure and vacuum relief as indicated at 516', may be employed, of a height producing a head greater than that in line 521, with its overflow returned to the surge tank 515 as shown, and in that case the flow from line 523 to the surge tank 515 other than via the standpipe 516 is eliminated, e.g., by closing valves 517 and 522 in the convertible system shown.

Line 521 feeds the warm product delivered from the most downstream unit via valve 503", through check valve 408 and heat exchanger 405 which reduces the temperature thereof, and if the cooler is to be bypassed valve 407' is closed and valve 407 is opened. The cooled emulsion then flows to product tank 403 preferably via means illustrated as standpipe 409 having pressure and vacuum relief means 409', for providing a constant pressure in line 521, which will appear at gauge 409" when valve 407" is open. Product storage tank 403 is preferably provided with pressure and vacuum relief means, shown as relief valves 401 and 402. Valve 410 controls removal of product from tank 403.

If it should be desired to alter the viscosity of all or part of the fine emulsion product, this may be accomplished by passing all or part of the emulsion delivered from the most downstream unit of the set 313, 313', etc. (herein from pressure maintaining valve 503") via valve 503'" to viscosity altering means exemplified in FIG. 2B between the valves 503'", 550A'", 114 and 521V, and illustrated more comprehensively in FIG. 2C, to which reference will now be made.

As shown in FIG. 2C, the viscosity altering means may comprise one or more of several equipments for altering the cement particle size of the emulsion with or without special preparation thereof, namely: means 560 for enlarging the emulsion particles by the freeze technique; means 562 for altering the size of the emulsion particles by passage through a high-pressure homogenizer, e.g. of the Manton-Gaulin type above described and/or means 563 for altering the size of the emulsion particles by passage through a vibrating reed type homogenizer, e.g. of the Rapasonic type above described. For facilitating the enlargement of the particles by the freeze technique, the emulsion may be specially prepared by mixing with a creaming aid as at 561 before subjecting it to the freezing and thawing at 560 to increase the size of the particles with corresponding alteration in the viscosity of the emulsion. Any suitable creaming aid, e.g., one selected from those heretofore used for promoting creaming of natural and/or synthetic rubber latices, may be used, viz: addition of electrolytes, change of pH, or adding natural or synthetic water soluble or dispersible polymers such as ammonium alginate, polymers of acrylic or methacrylic acids, and the like. Alternatively, to facilitate the alteration of particle sizes in the equipment 562 or 563 the emulsion may be specially prepared as above described with creaming aid, as illustrated at 564, or may be specially prepared by heating as shown at 566, or both, before subjecting to the size alteration steps. When the technique of heating at 566 is employed, it may be desirable to cool the emulsion of altered particle size as at 565. The heating in this connection tends to transfer part of the solvent from the emulsified cement particles, to form separately emulsified particles of solvent, per se, thus raising the viscosity of the cement particles to a point where further mechanical working will effectively only increase the particle size thereof, e.g. when by such heating the viscosity of the cement particles is brought into or above the range of 10,000 to 20,000 centipoises. It will be understood that the equipment connected between 503''' and 114'' in FIG. 2B is exemplary of the several forms of equipment usable at that location as shown in FIG. 2C.

In the form shown in FIG. 2B, switching to include the alteration of viscosity may be effected by any suitable means, and in the arrangement shown is effected by opening valve 503''' to feed discharge from the valve 503'' to the mechanical homogenizer (agglomerator) 413'' the orifice adjustment and pumping rate of which are adjusted to not lower the pressure in line 521, measured at 409'', below that required, e.g., that established by the standpipe 409 and check valve 408. With this arrangement more and more of the flow through 407'' will be diverted as the speed of the motor 413M driving the positive displacement pump is progressively increased and when flow through 407'' is virtually eliminated substantially all of the output from valve 503'' will pass to 413'' (except any part of such output which may be delivered through check valves 510, 510', etc., and valve 512, hereinafter described).

The valve 512, FIG. 2B, provides for partial or total recycle from pipe 521 to the input to the emulsion converting system 313, 313', etc., and may be employed during start-up or at other times as desired. Similar recycle provision may be made in the coarse emulsion units 312, 312', etc. with the aid of three way valve 109F.

Still referring to FIG. 2B, the invention contemplates operation of the several units 313, 313', etc., either at pressures recorded at 508, 508', etc., upstream of the orifice which are essentially the same or which differ in different units. When pressures differing in different units are employed, it is preferred that they differ by at least 50 psig; and such differing pressures preferably increases from unit to unit in the downstream direction. A first way of operating the units is to have identical orifice sizes in each of the units 313, 313', etc., and identical pumping rates therethrough, which will result in essentially equal pressures upstream of the orifices. With no intentional recycle via valves 520, 520', etc., and/or 520A, 520A', etc., and/or valve 512, under these conditions the flows through valves 510, 510', etc., and/or valves 507, 507', etc., will be minimized consistent with maintenance of equality of flows between the units. If identical degrees of recycle are to be provided in all units by way of valves 520, 520', etc., then the equality of flows between units will continue to be maintained, and only the residence time in the system will be changed. If different degrees of recycle are to be provided in different units by way of valves 520, 520', etc., or only one or more thereof, and essential equality of flows between units is to be maintained with minimum make-up or relief therebetween, then the pumping rates of the respective units must be adjusted in proportion to the degrees of recycle therethrough, and if the pressures downstream of the orifices are to be maintained essentially constant for the respective units, then the size of respective orifices must be increased in proportion to the flows therethrough. On the other hand, the invention in its broader aspects contemplates the operation of respective ones of the units of the converting system at different pressures from the others, e.g., a downstream unit at a greater or lesser pressure than the unit next upstream thereof, or a series of the units at progressively increasing or decreasing pressures. In accordance with this invention this effect may be achieved without intentional recycle by correspondingly changing the sizes of the orifices to change the pressures immediately upstream thereof. If it is not desired to change the orifice size, then such effect may be achieved by correspondingly proportionately changing the pumping rates and degrees of recycle in the respective units. Also such effect may be achieved by a combination of these procedures. By making these adjustments so that the interstage flows are maintained essentially equal to each other, the need for make-up and relief thereto may still be minimized.

If it is desired to decrease the emulsifier content of the final emulsion, or a part thereof, then valve 521V of FIG. 2B is correspondingly closed in whole or in part and valve 521V' correspondingly opened so that the desired portion of fine emulsion can flow to mixer 550M' where it is diluted with water by opening valve 550V'' until the aqueous phase is in the range for example of 50% to 80% by weight. The diluted aqueous fine emulsion is fed to centrifuge 550 of any suitable type (e.g. DeLaval Model No. 244, a trademark product) operated by motor 550M. Valves 550V' and 550V are adjusted to provide the desired split in serum and fine emulsion. The fine emulsion of lowered emulsifier content may be fed through line 114' to tank 403, and be there mixed with the portion of latex passing from 521 to 403 via valve 408. Alternatively, by adjusting valves 522V and 522V', all or part of the latex of reduced emulsifier content and/or of increased particle size from line 114' may be delivered to the line 521 downstream of the check valve 523, to constitute all or part of the latex variously delivered therefrom.

When it is desired to alter the particle size of emulsion prior to removing excess emulsifier by centrifuging, then valves 114, 521V', 403''', and 521V'' are correspondingly restricted and the high pressure homogenizer is operated at a pressure to coalesce or subdivide the emulsion particles passing therethrough. The emulsion if altered particle size is fed through line 550F to mixer 550M' where it is diluted with water supplied through valve 550V' and fed through line 550L to centrifuge 550 and the split between centrifuged emulsion and cerum is controlled through valves 550V and 550V'. The centrifuged emulsion of lowered emulsifier content is fed through line 114' and delivered to tank 403, or to line 521 downstream of valve 523, as aforesaid.

When it is desired to reduce the emulsifier content of fine emulsion and then alter the particle size thereof then the desired quantity of fine emulsion of reduced emulsifier content from the output of centrifuge 550, by regulating valves 550V'' and 503''', is passed to the high pressure homogenizer 413'' where the particle size is altered and by adjusting valves 521V'' and 114 the product passes through line 114' to tank 403 or line 521 downstream of valve 523, as previously described.

It is understood that where there is desired a large reduction in emulsifier content of the fine emulsion it may be necessary to dilute with water and centrifuge two or more times as via recycle valve 524. It is also understood that a plurality of high pressure homogenizers connected in series may be employed in the aforesaid process as well as a plurality of centrifuges connected in series with water diluting means therebetween. It will also be understood that while the arrangement shown in FIG. 2B is especially versatile and provides for minimized or controlled recycling, for delivery of very fine emulsion from line 521, or for modifying from 0 to 100% of said fine emulsion as by enlarging the particle size and/or reducing the emulsifier content thereof, in a particular installation for producing a particular product less than all of the provisions of the versatile system may be employed.

FIG. 3 illustrates means for carrying out the aerosol preparation in mixer 114 and means for separating and concentrating the latex as set forth in the process steps of FIG. 1. The aerosol flows to the separator 216 either (a) through aerosol particle coalescing means as exemplified at 115, 215 or 315; or (b) without aerosol particle coalescing means as exemplified at 415.

Separating the latex from the aerosol is effected herein under (a) above by a combination of coalescing means for coalescing the dispersed latex droplet phase of the aerosol into larger droplets or bodies of latex in the presence of the solvent-vapor gaseous phase, and means for then separating such larger bodies of latex from the solvent-vapor gaseous phase. In the present application and the aforesaid copending applications various forms of coalescing and separating means are disclosed, exemplified herein, e.g., by the delivery of the aerosol from the aerosol generator and stripper 114 (FIG. 3) through coalescing means 115, 251 or 315 to the hereinafter more fully described reduced pressure cyclone separator means 216, which is preferably internally coated by a sheet of liquid latex supplied via conduit 216F or via conduit 216G and liquid distributor 216A, which may be recirculated from the separator 216. The coalescing means 215 is a plate type tortuous path segregator which keeps coalescing the liquid phase by impingement, and breaking any bubbles formed therein by impact, as the latex and gas progress down the tortuous path along the pressure gradient to that of the separator 216, and delivers the coalesced bodies of latex and gas to the separator 216. The coalescing means 115 is shown as a centrifugal segregator in which the coalescence is effected by centrifugal force, e.g., a centrifugal pump operating with cavitation and fed with the aerosol, and is representative of similar centrifugal coalescers illustrated in the second and third of my aforesaid copending applications. And the coalescing means 315 is typical of means wherein the aerosol is projected against an impact surface 315A to effect coalescence of the liquid phase impinging thereon when the gaseous phase is deflected thereby, and when the impact surface 315A is arranged coaxially of the aerosol inlet and rotated by a suitable motor 315B, as shown, the coalesced liquid may be centrifugally discharged against the annular surrounding wall 315C and may be withdrawn separately from the gas phase via separate conduits 315D and 315E, respectively, the discharge to the latter being from behind the surface 315A in the form shown. In this latter case, the conduits 315D and 315E may both discharge into the separator 216 either directly or with the liquid delivered by way of the recirculating circuit as shown, or as illustrated in FIG. 16 herein, the separator 216 may even be omitted in some instances, where sufficiently low carryover of latex in the gas via 315E (11150) enables that conduit to be connected directly to the condenser vacuum system thus converting the unit 315 (1115) into a combined coalescer and separator as shown in FIG. 16. When the separating of the aerosol is effected herein under (b) above without use of a separate coalescer or segregator, the aerosol from 114G is delivered through a conduit 415 with flow restricting means shown as a single flow restricting valve 415B or two flow restricting valves 415A and 415B, by which the pressure can be raised in mixer 114 to a level which enables rapid removal of the solvent from the aerosol particles with essentially no coagulation thereof, before the final reduction of pressure therein on discharge of the resulting stream of aerosol and solvent vapors to the separator 216, maintained at lower pressure.

As will be apparent to those skilled in the art the invention in its broader aspects is not dependent on the use of any particular type of separating, condensing and evacuating apparatus. Conveniently, when stripping azeotroping solvent, in the arrangement of FIGS. 1 and 3 as a separator or collector 16 (216) may be used a vertical cylindrical receiver, with a downwardly tapering bottom leading to a discharge opening connected to a positive displacement pump for removal of separated latex therefrom without breaking the vacuum, with a tangential side opening for passage of the two flows thereinto, and with a top opening for the discharge of the continuous phase to the condensing equipment. The latter conveniently may comprise a single condensor to condense both solvent and water or two condensors, one for nonazeotroped water, and the other operating at a lower temperature for azeotrope of water and solvent. The evacuating apparatus conveniently may comprise a steam jet evacuation equipment connected to draw non-condensed material from the condenser equipment or a vacuum pump.

In the form shown in FIGS. 3, 5 and 6, the collector 216 generally resembles a cyclone collector into which the gaseous flow and any latex droplets carried thereby are discharged tangentially from the inlet 215H, and guided along the walls by appropriate internal baffling, e.g., the spiralling skirt 216D, so that the liquid collects on the walls and flows to the bottom outlet 216C, while the gas passes to the top outlet 216D' by the way of the passage afforded by the central drop tube, or equivalent baffling means, 216D to the condensor/vacuum system. Pump 216E, FIG. 3 delivers the latex from the outlet 216C through the outlet valve 216B and, depending on pump and valve setting, wholly or partly via the recycle lines 216G, 216L. Valve 216M can be a pressure opened relief valve for maintaining a delivery pressure at the output of pump 216E while recycling all the latex not delivered by pump 324 or otherwise removed. As before mentioned, the walls of the collector 216 are preferably covered by a flow of latex from a distributor (616A of FIG. 6), which provision facilitates the collection of the latex droplets delivered by the gas stream while minimizing or eliminating foaming.

Still referring to FIG. 3, in the arrangement shown provision is made for concentrating the latex being supplied to form the sheet of latex. This provision includes the supply line 216L for the latex to be concentrated, pump 216E feeding said line, heater 220 for heating the latex, and preferably flow restricting or pressure maintaining means 221 for maintaining a pressure in the heater 220 sufficient to prevent boiling of the latex therein. By this preferred arrangement (hereinafter called "manner I") the latex is heated without boiling in the heater 220, whereby any tendency to form coagulum in the heater is minimized, and the concentration of the so heated latex is effected outside the heater 220 by reduction of pressure through the means 221 in the absence of further heating. With less advantage, the flow restricting means of valve 221 may be adjusted in a manner (hereinafter called "manner II") to allow boiling to occur in the heater, but the formation of vapor in portions of the heater then reduces the efficiency of the heater and also produces a tendency for drying out of latex on the hot surfaces with consequent formation of coagulum therein especially if latex flow rate is reduced.

As is also shown in FIG. 3, the freshly stripped latex, preferably without removal of its residual solvent, is delivered by pump 324a via heat exchangers 325a and/or storage hold tank 324b to means for modifying the latex which may be used separately or in combination in the arrangement shown. The concentrating circuit 1216–1220 corresponds with the concentrating circuit 31-32 of FIG. 1 and the modifying equipment 1224–1233 provides for delivering the latex from 324a or 324b to a polymerization reactor 1227 (either directly or after concentration in the concentration equipment sections 1216–1220), where it is combined with polymerization catalyst, monomer, cross-linking agent, compounding ingredients and/or emulsifier, from selected ones of sources 1224a to 1224e for modifying the size and nature of the latex polymer as described more particularly in my aforesaid copending applications.

The modified latex from the reactor 1227 may be mixed with further emulsifier in mixer 1224f and may be passed to storage 1233, with or without first recycling it through the concentration equipment section and/or the polymerization reactor. Where further stabilization is desired emulsifier may be added from 324C or 324D.

FIG. 3A illustrates diagrammatically a further preferred embodiment of collector or separator system embodying features of the invention.

In this arrangement stripper mixer 314 disperses the aqueous emulsion of precursor latex sized solvent and polymer droplets into the gaseous stream of steam whereby the solvent is vaporized in conduit 415 and discharged into collector separator 316 at a lower pressure than is maintained in the stripper mixer 314 with such pressure differential preferably being controlled in conduit 415 with the aid of flow restricting means, e.g., a valve 415B or valves 415A and 415B. The separator 316, in the form shown, is of the type illustrated in detail in FIGS. 5 and 6, and comprises a first tangential inlet (215H, FIG. 5) for the latex and solvent vapor stream and a second tangential inlet 316 F (616A, FIG. 6) for a stream of latex without solvent vapor, e.g., latex or latex and water vapor from a recirculating and/or concentrating circuit as illustrated at 216F to 216L in FIG. 3. In FIG. 3A the latex and solvent vapor is delivered tangentially into the separator 316 directly from the mixer 314 via conduit 415 with or without flow restricting means 415B (or 415A with 415B). To afford a safety factor in case of latex entrainment or if misadjustment of flows produces carryover or foaming, the vapor outlet 316D from the segregator-collector 316 delivers to the tangential inlet of a second collector 416, the temperature of which is maintained so that the solvent and its aqueous azeotropes remain in vapor phase by suitable means such as a circulating water jacket 416M or excess steam supplied via the aerosol or directly, to remove from the vapor stream entrained latex particles or foam and prevent the same from passing to the solvent recovery system via conduit 416D. Any latex so recovered is delivered from separator 416 by way of valve 416B and pump 416E for further concentration. The third separator 516 in FIG. 3A is in essence a replica of and backs up the separator 416. When the three separators shown in FIG. 3A are made progressively smaller, the gas velocities increase progressively, aiding the throwing down from the vapor stream of the small quantities of latex carryover (droplets or foam) in the separators 416 and/or 516.

A further exemplification of the process improvements just described, and of preferred arrangements of apparatus for facilitating the practice thereof, are set forth in FIG. 3B. In this arrangement two aerosol generators 2114(A) and 2114(B) are included, which may be provided with valves 2520 and 2520' these valves may be adjusted to serve as flow restricting means to control the back pressures on the mixers 2114(A) and (B) which may be operated separately or together, and may be adjusted so that one generator may be operatively connected to the separator 2216 while the other is isolated for maintenance or cleaning.

In the form shown, when the two aerosol generators 2114(A) and 2114(B) are operated together, the passages through valves 2520 and 2520' may be more open, or even wide open, as the illustrated restriction of the path leading to the separator 2216 downstream thereof is sufficient to aid in, or effect, the restriction of pressure gradient or pressure drop in the preceding or upstream extended portion of relatively large combined cross-section in which substantially all of the vaporization of solvent from the dispersed droplets is effected. Thus with the aid of the means 2520, 2520' and/or other flow retarding means properly proportioned or set, the pressure gradient in the upstream portion of the passage, where essentially all of the solvent vaporization occurs, may be restricted to be not so large as to cause destabilization of the latex, as by displacement of emulsifier from the discontinuous phase thereof.

To maintain the flow of liquid in the separator 2216 upon which the aerosol is impinged, the separator is provided with a level controlled pump 2216E which delivers to the product outlet pump 2324 a part of the circulating liquid under a fixed head maintained by squeeze valve 2216M, the remainder of the circulating liquid being delivered through the squeeze valve to a constant level tank 2324M which may be maintained under reduced pressure as by a valve controlled connection 2324L to the partially evacuated separator 2216.

The constant level in the hold tank 2324 M is maintained by pumps controlled by the level therein which deliver to or from a storage tank (not shown) via connection 2324K.

A pump 2324N delivers liquid from the hold tank 2324M under a suitable pressure, in the range of 10 to 100 psig (preferably about 50 psig) through one of two alternatively usable filters 2324P(A) and (B) which are each provided with isolating valves V and the usual drain cocks and, if desired, with valve controlled solvent cleaning circuits 2402 so that in lieu of changing the filters periodically they may be solvent washed in place.

The liquid (i.e., latex except at start-up) is delivered under pressure from the operating filter 2324P (A) or (B) through line 2216B provided with a pressure gauge 2325 to one or both of the two simultaneously or alternatively usable, preferably plate type, heat exchanges 2220 (A) and (B) which are provided with pressure controlling means, e.g., valves 2510 and 2510' manually or automatically adjustable for preventing or restricting boiling in the heat exchangers, and which may also be employed to isolate one of the heat exchangers for cleaning with the aid of the flushing and solvent cleaning circuits 2403. Said heat exchangers are also provided with valve controlled sources 2236 of heating fluid at less than 212° F. (e.g., 180° F.) for use, if desired, when solvent cleaning at greater than 212° F. but preferably not more than 260° F. (e.g., 235° to 245° F.) for use in processing; and with "off" and cold water positions for use during shut-down of operations and start up of operations. When operating in manner (I) (described above in connection with FIG. 3) valve 2510 and or 2510' may be opened manually or by pressure or temperature responsive means only to such extent that no boiling occurs in the heat exchanger plate package; or when operating in manner (II) (also there described) valve 2510 and/or 2510' may be opened manually or by pressure or temperature responsive means, to a sufficient extent to allow controlled boiling to take place in the plate heat exchanger 2220(A) and/or 2220(B). As above noted in connection with the means 2520 and 2520', other means may be used in lieu of or with the means 2510-2510', e.g., non-adjustable restrictions, to in-whole or in-part affect the upstream pressure maintainence.

The liquid latex, or water during startup, with about 27' of vacuum in the separator 2216, operating in manner (I) is heated in the plate heaters 2220(A) and/or (B) as its pressure drops from about 65 psig to about 15 psig, or, when operating in manner (II) its pressure drops therein to a greater extent, e.g., to 10 to 27" of vacuum. The liquid latex concentrated by the heating and reduction of pressure provides the flow of liquid to separate the latex particles impinged thereon from the solvent vapor stream delivered to the separator 2216 by the mixer 2114(A) and/or (B). A source of flushing water 2237 is also provided for flushing out the entire circuit 2216-2220(A) and/or (B) on shut-down.

Further exemplifications of the process improvements described in FIG. 3B are set forth in FIG. 3C. The aqueous emulsion of solvent cement is sent to storage tank 3118 with agitator 3118' and then said emulsion passes through filter 3117 or a pair of filters with valving so that while a single filter is in operation the other filter can be cleaned. From the filter the said emulsion is gravity fed to a positive displacement pump 3116 capable of handling latex and on opening valve 3114E is fed to the mixer 3114 and therein the said emulsion is mixed with sufficient steam to convert liquid phase solvent of said emulsion to vapor. The steam to said mixer 3114 is controlled by valve 3521' and the pressure in the mixing zone and the pressure in the conduit 3114' connecting to the separator 3216 may be increased to the desired amount above the pressure in separator 3216 by partially closing valves 3519 and/or valve 3520 thus restricting the flow to the separator 3216. For separating the solvent vapor from the stream of latex particles separator 3216 may be a vertical cylindrical receiver with a downward tapering bottom leading to a discharge pump 3216E with a level controller 3216E' to maintain a liquid level in the separator discharge pipe and the gaseous phases are removed via the separator overhead vapor outlet 3316D', said separator having a tangential side opening 3215 with openings for three flows thereinto via conduits 3114', 3511 and 3511'. The stream of solvent vapor, water vapor and latex particles flowing through conduit 3114' is impinged on a flow of latex from either of conduits 3511 or 3511' or is entrapped between flows from conduit 3511 and 3511'. The liquid latex from separator 3216 is pumped by pump 3216E through conduit 3216F' through one of the filters 3324 or 3324' with the aid of 3-way valves 3340 and 3341, or any other suitable multiple valving system, to the regulated output pressure pump 3324N with its pressure relief bypass valve 3324N'.

Conduit 3216F', delivering to the duplex filters, is connected to surge tank 3324M with a level controller connected to latex product removal pump 3325 which maintains the latex level in tank 3324M. The recycle latex pump 3324N provides a continuous pressure flow of recycled latex through conduit 3216B to plate heat exchangers 3220A and 3220B, and 3-way valves 3432 and 3432' or any other suitable multiple valving system serving a similar purpose are provided so that latex may flow through both heat exchangers 3220A and 3220B or through only one of these heat exchangers while the other is being solvent cleaned or disassembled and cleaned. A flow of stream and/or hot water at suitable temperature for heating exchangers 3220A and 3220B is controlled by valves 3236A, 3236A', 3236B and 3236B'.

Heat exchanger 3220A is connected to separator 3216 via conduit 3511 with valves 3509 and 3510 and in a like manner heat exchanger 3220B is connected to separator 3216 via conduit 3511' with valves 3509' and 3510' and if the said heat exchangers are maintained at a sufficiently high temperature and the separator 3216 at sufficiently low pressure and the said valves are open then boiling of the latex can take place in said heat exchangers; however, the preferred method of operation is to partially close one or both of the valves of pair 3509 and 3510 or the valves of pair 3509' and 3510' to prevent boiling of the latex in heat exchangers 3220A and 3220B if employed simultaneously or alternately.

Further exemplifications of the process improvements described in FIG. 3B and FIG. 3C are set forth in FIG. 3D. The aqueous emulsion of solvent cement is sent to storage tank 4118 of FIG. 3D and kept moderately agitated by agitator 4118' and then said emulsion passes through filter 4117 or a pair of filters with valving so that while a single filter is in operation the other filter can be replaced or cleaned. From the filter the said emulsion is gravity fed to a positive displacement pump 4116 capable of handling latex and by valves 4114E and 4114E' is fed alternately to one or both of mixers 4514 and 4514' and in these mixers the said emulsion is mixed with sufficient steam to convert liquid phase solvent of said emulsion to vapor. The steam of said mixers 4514 and 4514' is controlled by valves 4521 and 4521'. The pressure in the mixing zones and the pressure in the conduits connecting to the separator 4216 may be increased to the desired amount above the pressure in separator 4216 by partially closing valves 4519 and/or 4520 of mixer 4514 or by partially closing valves 4519' and/or 4520' of mixer 4514', thus restricting the flow of the separator 4216 (as described in connection with the corresponding elements in FIG. 3C).

In mixer 4514 stripped latex may be introduced either into the aqueous emulsion of solvent/polymer composition feed from line 4216B with aid of pump 4511 and by opening valve 4512, or such recycle may be delivered through valve 4510 to nozzle 4114'. Alternately in mixer 4514' a steam supply 4521" is provided which enters the mixer by a circumferential inlet 4114'''. For separating the solvent vapor from the stream of latex particles separator 4216 may be a vertical cylindrical receiver with a downward tapering bottom leading to a discharge pump 4216E with a level controller 4216E' to maintain a liquid level in the separator discharge pipe and the gaseous phases are removed from the separator overhead vapor outlet 4316D', said separator having a tangential side opening 4215 with openings for four flows thereinto via conduits 4514, 4514', 4511 and 4511'. The stream of solvent vapor, water vapor and latex particles flowing through conduits 4514 and/or 4514' is impinged on a flow of latex from either or both of conduits 4511 or 4511'. The liquid latex from separator 4216 is pumped directly through line 4216F' or to the surge tank 4234M and then through one of filters 4324 or 4324' with the aid of 3-way valves 4340 and 4341, or any other suitable multiple valving system to conduit 4216B with the aid of continuous pressure output pump 4324N-4324N'. The line 4216F' has latex product removal means through pump 4325 controlled by the latex level in surge tank 4234M by pump level controller 4324P. The recycle latter pump 4324N provides a constant pressure flow of recycled latex through conduit 4216B to plate heat exchangers 4220(A) and 4220(B), and 3-way valves 4432 and 4432' or any other suitable multiple valving system serving a similar purpose are provided so that the recycled latex may flow through both heat exchangers 3220(A) and 3220(B) or through only one of these heat exchangers while the other is being solvent cleaned or disassembled and cleaned. A flow of steam and/or hot water for heating exchangers 4220(A) is controlled by valves 4515A and 4515A' and for heat exchanger 4220(B) is controlled by valves 4515B and 4515B'.

Heat exchanger 4220(A) is connected to separator 4216 via conduit 4511 having valves 4509 and 4510 and in a like manner heat exchanger 4220(B) is connected to separator 4216 via conduit 4511' having valve 4510' and if the said heat exchangers are maintained at a sufficiently high temperature and the separator 4216 at sufficiently low pressure and the said valves are open then boiling of the latex can take place in said heat exchangers, however, the preferred method of operation is to partially close one or both of the valves of pairs 4509 and 4510 or the valve 4510' to prevent boiling of the latex in heat exchangers 4220(A) and 4220(B) if employed simultaneously or alternately, as hereto fore described. If desired conduit 4511 can be provided with a spiral vane foam breaker 4522. Conduit 4511' connecting heat exchanger 4220(B) to separator 4216 can be supplied with a latex or steam jet foam breaker 4114A to which latex is supplied from line 4216B via pump 4513 through valve 4513' and discharged into conduit 4511' through nozzle 4114A (e.g., as shown in FIG. 4), or to which steam may be supplied via steam inlet valve 4521".

FIG. 4 illustrates a suitable form of stripping mixer (14, FIG. 1; 114, FIG. 3) 114 for dispersing the aqueous emulsion of precursor latex sized solvent/polymer composition droplets into the gaseous stream of steam. In the form shown in FIG. 4 this mixer consists of a conduit section 114, which may be transparent, which has supported centrally thereof a torpedo shaped or fid-shaped member 114A for producing a restricted or venturi-effect passage 114B thereabout. The initial continuous phase of steam is admitted as at 114C to flow through the passage 114B and produce an area of high velocity and low static head thereat. The aqueous emulsion of solvent/polymer composition is introduced into the central body 114A as by way of the tube 114D upon which it is supported, and issues into the gas stream via a narrow slot 114E extending peripherally of the body 114A at the region of greatest pressure reduced in the space 114B. Auxiliary steam and/or emulsifier may be introduced at 114F and 114G. When a downstream inlet, as 114G, is employed for admission of steam (e.g., at 4114''' in FIG. 3D), it is desirable to have the quantity of steam admitted upstream thereof, as at 114C, or at 114C and 114F, sufficient in heat content to vaporize substantially all the solvent from the precursor latex sized particles of the aerosol produced in the space 114B. When this condition is attained, as observed through the transparent conduit section 114 the surfaces bounding the annular and cylindrical passage through the conduit 114 remain free of liquid or solid materials and no foaming can be seen. The outlet of the aerosol generating section 114 connects via flow restricting means (e.g., FIG. 1, 15'; 415A, FIGS. 3 and 3A; 2520, 2520' FIG. 3B; 3519, 3520, FIG. 3C; 4519, 4520, 4519' and 4520', FIG. 3D, above described) to the vacuum equipment by way of the separating and collecting system, as exemplified in FIGS. 3, 3A and 5–6, and the pressure in the chamber 114 is such that the temperatures attained do not exceed those at which the emulsion and latex are stable. As above noted, the heat for vaporization of the solvent from the solvent/polymer composition is derived from the condensation of the steam, and the flowing stream of organic and water vapor carrying the resulting suspended latex droplets is in the nature of an aerosol, exhibits no foaming in the tube 114, and does not coat or foul the tube 114. As is illustrated in FIG. 3, the aqueous emulsion of solvent/polymer composition is usually supplied to the mixer 114 under pressure, as by a pump 114H; and the separating means may be of any suitable form, e.g., the forms of FIG. 5 and FIG. 6, above described.

FIG. 7 illustrates diagrammatically a further preferred embodiment of collector or separator system embodying features of the invention. In this arrangement the separators 216', 216" and 216'" may be of the type illustrated in detail in FIGS. 5 and 6. Separator 216' comprises a first tangential inlet for the latex and solvent vapor stream and a valve or restriction 415B' and a second tangential inlet 616A' for a stream 216F' of latex without solvent vapor, e.g., latex or latex and water vapor from a recirculating and/or concentrating circuit is illustrated in FIG. 3 at 216L to 216F, or latex from any other source, or of a different polymer composition than that carried by the stream 215H, when a mixture of latices is to be produced. In FIG. 7, the latex and solvent vapor is delivered tangentially into the separator 216' via conduit and valve 415B' directly from the mixer 114' (as in FIG. 3, without the interposition of any initial segregator 115, 215, or 315, preferably with the flow restricting means 415B as therein shown). In FIG. 7 the vapor outlet 216D' from the segregator-collector 216' delivers to the first tangential inlet of a second collector 216", in which the second tangential inlet 616A" supplies a stream of latex 216F'" to entrap any latex droplets and foam carried thereto via 216D', such streams of latex preferably being pumped from the outlet 216C' of the first separator 216' and optionally being heated as by a plate heater 220' before being delivered to separator 216" to a sufficient extent to evolve further water vapor from the latex in separator 216" for concentrating the latex. In like manner the gaseous phase from 216" may be delivered via 216D" to a third separator 216'", together with optionally heated latex, preferably from 216" via 216C" and 216F'". When the several separators are made progressively smaller, or when heaters 220' and 220" are used and steam is evolved in the respective separators, the gas velocities increase progressively, aiding the throwing down from the vapor stream of the small quantities of latex carryover (droplets or foam) in the separators 216" and 216'". When using this arrangement without any segregator (as 15 of FIG. 1) ahead of the collector 216' to coalesce the droplets of latex without foaming, entrainment of latex may occur through the outlet 216D'. However, by employing one or more of the back-up separators or traps (two of which are shown at 216" and 216'" in FIG. 7) any entrained latex may be thrown down, with or without the aid of increased velocity, thus preventing loss of the carried over material.

FIG. 7A illustrates diagrammatically a still further preferred embodiment of features of the inventions. In this arrangement the separators 216', 216", 240' and 240" may be of any suitable type, e.g., of the type illustrated in detail in FIGS. 5 and 6. Separator 216' comprises a first tangential inlet for latex, solvent vapor and steam 215H, a flow restricting means or valve 215H' to regulate the back pressure, and a second tangential inlet 221A' and 221B' for streams of latex from heat exchangers (preferably plate heat exchangers) 220A' and 220B' with flow restricting means or valves; said streams of latex being essentially free of solvent vapor, e.g., latex from recirculating and/or latex concentrating circuit as illustrated at 216I' to 221A' and 216I' to 221B" and in FIG. 3 in 216L to 216F or latex from any other source or latex of a different polymer composition than that carried by the stream 215H, when a mixture of latices is to be produced. In FIG. 7A the aqueous emulsion of precursor latex sized solvent/polymer material is delivered through pipe 114C' to stripper-mixer 114' together with steam supplied through valved line 114D' and the resulting aerosol is conveyed through conduit section 215H with the pressure therein being regulated by the flow restricting means or valve 215H'. The aerosol of latex and solvent vapor, with or without excess steam, is delivered tangentially into separator 216' which operates at a lower pressure than the pressure within the mixer-stripper 114'.

In the form shown in FIG. 7A the skirt in separator 216' differs from the skirt 216D in FIGS. 5-6 in that it takes the form of a cylindrical wall generally concentric with and preferably in fairly closely spaced relation to the surrounding wall of the separator to define a relatively narrow annular space extending completely around the separator, closed at its top and open at its bottom, into which the flows of aerosol and latex are delivered to cause the aerosol droplets to impinge on the latex flowing helically, peripherally and downwardly inside the confining wall. In this arrangement a multiplicity of tangential inlets alternately for latex and for aerosol, as exemplified in FIGS. 3C and 3D, may readily be accommodated, it being understood that the latex will be delivered thereby so as to be impinged upon by the aerosol in any such arrangements. The vapor outlet from the segregator-collector 216' delivers to the tangential inlet of a second collector 240', operated at a lower pressure than separator 216' and a non-condensing temperature for the solvent and its aqueous azeotrope (as in FIG. 3A), which entraps any minor quantity of latex droplets and/or foam that may be carried thereinto via 216D', and conduit 240D' carries away the gaseous vapors to the condensing system. The latex separated in 216' with the aid of pump 216C' may in part be discharged through valve 216H', but preferably said latex is pumped via line 216F' alternately through filters 230A' and 230B' before further concentration or withdrawal. For partial concentration and for forming the flow of latex in 216', the filtered latex is delivered via conduit 216J' alternately or concurrently through heat exchangers 220A' and 220B' delivering tangentially into separator 216' via lines and valves 221A' and 221B', and when said valves are sufficiently open boiling takes place in the heat exchanger 220A' and 220B', however, the preferred embodiment is to partially close the valves until no boiling occurs in heat exchangers 220A' and 220B'.

To avoid flooding separator 216' an amount of latex equal to that entering the separator at 215H must be removed, via conduit 216H' and/or conduit 216K. The partially concentrated latex removed via conduit 216 is pumped via pump 240D" with the aid of three-way valves 240E' and 240E" to surge tank 240E and therefrom to conduit 216F'" with the aid of pump 240E'" (or alternately, the surge tank may be bypassed via line 216K") and thence through alternate filters 230A" and 230B" and through conduit 216J" alternately or concurrently through heat exchangers 220A"; and 220B" and tangentially into concentrator 216". Valves 221A" and 221B" when sufficiently open permit heat exchangers 220A and 220B" to be operated so that boiling takes place within the heat exchangers, however, in the preferred manner of operating the valves 221A" and 221B" are partially closed until no boiling of the aqueous phase of the latex occurs in heat exchangers 220A" and 220B". To inhibit carryover or entrainment of latex particles and/or foam to the vapor recovery system, separator 240" is interposed between conduits 216D" and 240D" and this separator functions similarly to separator 240' which is interposed between conduits 216D' and 240D' and any carried over latex which is thrown down by separator 240" is discharged from the bottom of the separator and pumped by pump 240C" into recycle conduit 216J" and in a like manner separator 240' discharges with the aid of pump 240C' into recycle conduit 216J'. Partially concentrated and filtered latex product may be removed via conduit 240H', and/or product after final concentration may be removed through conduit 240H" by opening valve 240K'" or after filtering through conduit 240H'" via valve 240K'" with the aid of pump 240K.

If it should be desired to alter the viscosity of all or part of the latex product, this may be accomplished by passing all or part of the latex delivered by pump 240P via valve 2413V to viscosity altering means exemplified in FIG. 7A between the valves 2413V, 250V, 231V and 116V, and illustrated more comprehensively in FIG. 7B, to which reference will now be made.

As shown in FIG. 7B, the viscosity altering means may comprise one or more of several equipments, for altering the particle size of the latex, with or without special preparation thereof, namely: means 260 for enlarging the latex particles by the freeze technique; means 262 for altering the size of the latex particles by passage through a high-pressure homogenizer, e.g., of the Manton-Gaulin type above described, and/or means 263 for altering the size of the latex particles by passage through a vibratory reed type homogenizer, e.g., of the Rapasonic type above described. For facilitating the enlargement of the particles by the freeze technique the latex may be specially prepared by mixing with a creaming air as at 261 before subjecting it to the freezing and thawing at 260 to increase the size of the particle with corresponding alteration in the viscosity of the latex. Any suitable creaming aid, e.g., one selected from those heretofore used for promoting creaming of natural and-/or synthetic rubber latices, may be used, viz: addition of electrolyte, change of pH or adding natural or synthetic water-soluble or dispersible polymers such as ammonium alginate, the ammonium or alkali metal salts of polymers of acrylic or methacrylic acids, and the like. Alternatively, to facilitate the alteration of particle size in the equipment 262 or 263 the latex may be specially prepared as above described with creaming aids, as illustrated at 264, or may be specially prepared by heating as shown at 266, or both, before subjecting to the size alteration steps. When the technique of heating at 266 is employed, it may be desirable to cool the latex of altered particle size, as at 265. The heating in this connection tends to reduce the stability of the latex so that mechanical working can more readily increase the particle size thereof. It will be understood that the equipment connected between 2413V and 231V in FIG. 7A is exemplary of the several forms of equipment usable at that location as shown in FIG. 7B.

In the form shown in FIG. 7A, to provide altered particle size latex a supply of latex from pump 240P or from valve 231V is passed through line 2413L to the size altering means 2413. The latex product of altered particle size may be delivered through line 2413L' and valves 116V and 116V' as latex product "C".

To provide latex of decreased emulsifier content, a supply of latex is passed through line 250F and flows through centrifuge 250 (e.g., DeLaval Model No. 244, a trademark product). In order to centrifuge the latex the dry solids content by weight of such latex must be reduced to the range of 20-40% by addition of water by opening valve 250W. The operation of the centrifuge is controlled by controlling serum take-off by adjusting valve 250V' and latex product valve 252V to provide the latex product designated "B" which may be delivered through line 252.

An alternate supply of lower solids latex from an earlier stage in the process with or without further water dilution, may be fed to the centrifuge via line 114L' by adjusting valves 114V, 114V' and 231V'. In a preferred operation the centrifuge is supplied with dilute latex, requiring little or no water addition, via valves 114V and 231V".

Latex of both reduced emulsifier content and increased particle size can be produd by opening valve 252V and permitting the centrifuged latex to flow through line 2413L" and 2413L to an equipment of FIG. 7B, exemplified at 2413, FIG. 7A.

Alternatively latex from the so exemplified equipment may be supplied by line 2413L' and by controlling valve 231V is supplied to centrifuge 250 and the latex delivered through line 252 as latex product "B".

Encompassed within the scope of the process described by FIG. 7B is the employment of a plurality of the equipments 262 or 263 connected in series as described under the equipment arrangement for preparing the emulsions of solvent polymer cement, and the latex may be recycled through one or more of such equipments as by pump 267. Further encompassed within the scope of the process described by FIG. 7A is the use of two or more centrifuges connected in series with serum removal and water addition between centrifugation steps. Alternatively the latex may be passed through the centrifuge two or more times with water dilution of the latex between the centrifugation steps via recycle valve 224' to mixer 250M supplied with water from valve 250W.

Aqueous emulsion of solvent/polymer cement can be prepared with an emulsifier content which is not sufficient to permit stripping with the aid of steam without formation of an appreciable quantity of polymer coagulum; however, by blending the said emulsion with stripped latex from which solvent and water have been removed without substantial removal of emulsifier, the emulsifier content in the aqueous phase of the blend can be made sufficient to permit stripping without appreciable formation of coagulum. This provision of the present process is illustrated in one embodiment in FIG. 7A, wherein pre-mixer 114M is supplied with an aqueous emulsion of solvent polymer cement through conduit 114E' and stripped polymer latex through conduit 114L, this stripped latex being recycled from a location downstream of the stripper 114' with the aid of pump 114P to pre-mixer 114M; the latex/emulsion blend flowing to mixer-stripper 114' and through conduit 215H and valve 215H' to separator 216'.

Pump 114P may draw the recycled latex from the separator 216' via line 115 and by opening valve 115V, but preferably draws more concentrated latex from a more downstream separator 216" via line 115' by opening valve 115V' or via line 240H'" as by opening valve 120. Less desireably the pump 114P may draw latex of augmented particle size by opening valve 117, or even of reduced emulsifier content or both reduced emulsifier content and augmented particle size by opening valve 119.

In modifications of the invention illustrated in FIGS. 8 through 11, an additional step is employed in that coalescence and separation of the aerosol are aided by combining the stream of aerosol and the stream of concentrated latex and water vapor evolved therefrom in a mixer and intimately commingling the same before introducing them into the separator (zone of minimum pressure).

Referring to FIGS. 8 to 11, in these embodiments as in those above described, there is provided a moving flow 814a of gas essentially comprising steam as an initial continuous phase, and a flow 813a of aqueous emulsion of solvent-polymer cement. The cement preferably consists essentially of a dispersion of not more than 40 parts of the polymer composition 4 (FIG. 1) in essentially not less than 60 parts of water immiscible volatile organic solvent which itself, or as an azeotrope with water, has a boiling point lower than that of water. In determining these ratio limits other materials present, e.g., emulsifier, are not included in the calculation. An aerosol generator 814 is provided in which the flow of emulsion 813a is dispersed, as a discontinuous phase, in the flow 814a, in such proportions that sufficient heat is supplied by the steam flow 814a to vaporize substantially all the solvent from the liquid phase into the gaseous phase of the flow in 814, to form an aerosol therein while adding the condensate formed therein to the discontinuous phase of the aerosol. The flow of aerosol is withdrawn from the generator 814, and in accordance with these modifications, is subjected, in the combination hereinafter described, to a separation of its liquid discontinuous phase from its continuous gaseous phase to form a latex by passing it into a suitable separator 816. A flow of the latex is withdrawn from the separator 816 and this flow is mixed with the flow of aerosol withdrawn from the generator 814 in a mixer 821 of any suitable construction (e.g., the form of any of FIGS. 12 to 15 may be employed) to produce the combination in which the aerosol is subjected to separation in the separator 816, so that the admixture of the flow withdrawn from 816 with the flow of aerosol before its introduction into the separator 816 may assist in the coalescence and separation of the liquid and gaseous phases. A part of the latex separated in the separator 816 is withdrawn as output, as by pump means 822.

In practicing these modifications, further improvements may be obtained by converting to a flow of water vapor mixed with bodies of more concentrated latex the withdrawn stream of latex passing from the separator 816 to the mixer 821, as by passing it through a water vaporizer 820 which may be of the plate type described above (see 220-221 and 1220-1221, FIG. 3). In this modification the bodies of more concentrated latex mixed with the aerosol in mixer 821 aid in coalescing the discontinuous phase thereof in said mixer, and the water vapor from 820 dilutes the solvent-vapor content of the aerosol and alters the partial pressures to the advantage of the later.

Figure 8:
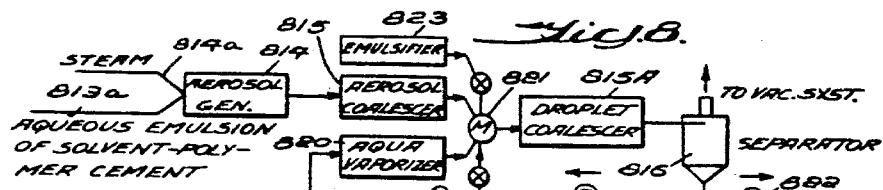
FIGS. 8 to 11 are diagrammatic flow sheets indicating modes of admixing partially concentrated latex, with or without water vapor evolved therefrom, with the gaseous and liquid phase from the aerosol generator, for aiding in the segregation and separation thereof.
Figure 9:
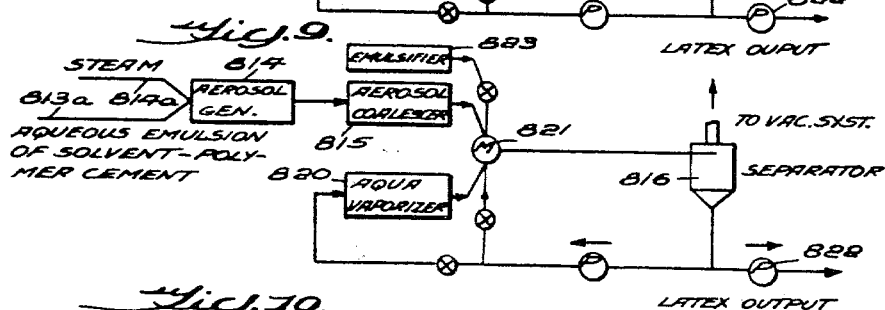
Figure 10:
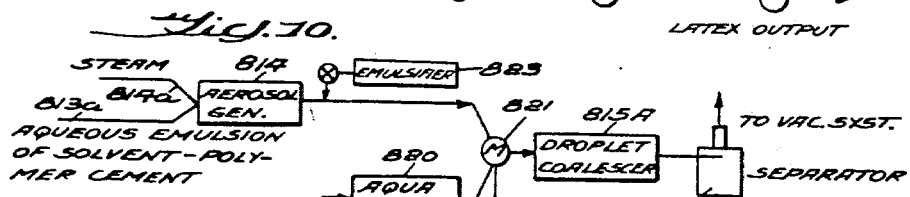
Figure 11:
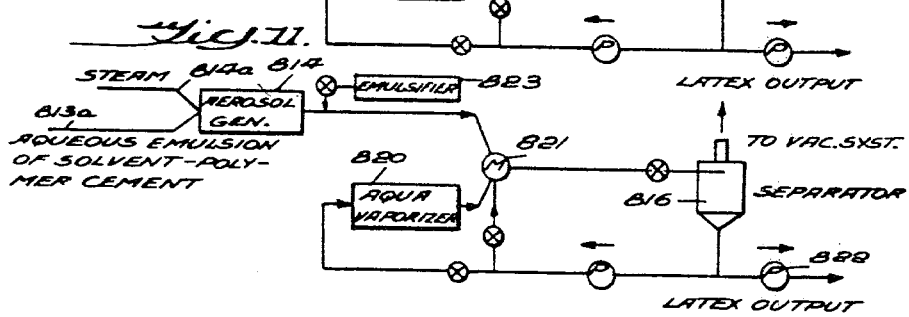

As shown in FIGS. 8, 9 and 10, the aerosol from generator 814 may be subjected to coalescing stresses as by passing it through a coalescing means 815, similar to those above described, prior to its introduction to the mixer 821; or the mixed flow of latex and vapor produced by the mixer 821 may be subjected to coalescing stresses as by passing it through a coalescing means 815A, similar to those above described; or both of these provisions may be included. For simplicity, the use of coalescers 815 and 815A of the plate type tortuous path segregator form above described (215, FIG. 3) is preferred in these embodiments. In the form of FIG. 11, the latex and steam from 820 is introduced into the aerosol via mixer 821 between the aerosol generator and the separator 816 ahead of the interposed pressure gradient regulator (e.g. 215H' in FIG. 7A).

Especially when these modifications are carried out using an aqueous emulsion of solvent-polymer compositon 813a which is unstable and has its dispersed phase only temporarily of precursor latex particle size, it is advantageous to add further emulsifier 823 to the fluids being mixed in 821. Such addition may be effected by adding the emulsifier at the mixer or to at least one of the flows of fluid passing thereto, as shown.

Figure 12:
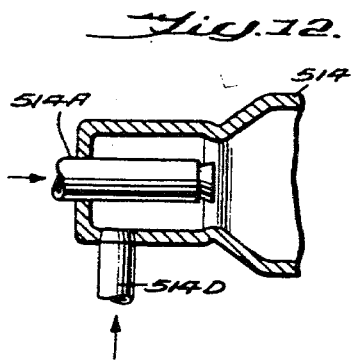
Figure 13:
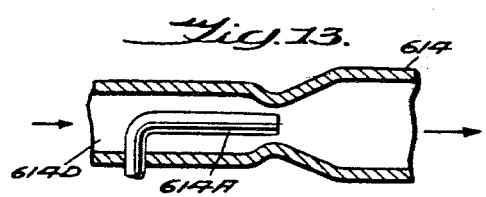

FIGS. 12, 13, 14 and 15 as above noted show several types of mixing nozzles 514, 614, 714 and 814 respectively in which the aqueous emulsion of solvent-polymer composition enters at 514A, 614A, 714A and 814A and is mixed with steam which enters at 514D, 614D, 714D and 814D respectively and these mixing nozzles, as well as the form 114 of FIG. 4, are suitable as aerosol generators or mixers, e.g. 14 of FIG. 1; 114 of FIG. 3, 314 of FIG. 3A; 2114(A) and 2114(B) of FIG. 3B; 3114 of FIG. 3C; 4114 and 4114' of FIG. 3D; 114' of FIGS. 7 and 7A; 814 of FIGS. 8-11; 1314 of FIG. 17; and 1114 of FIG. 16, in connection with which they are more fully described. In the form of FIG. 12 the conduit 514 is shaped to provide a venturi-like section, and the discontinuous phase is dispersed into the continuous phase (supplied through 514D) by a slotted nozzle 514A located axially of the venturi-like portion of the conduit. In FIG. 13 a similar arrangement 614, 614A, 614D is provided, the nozzle having an axial non-annular discharge at the venturi area; and the mixer 714 of FIG. 14 is similar but with the supply connections reversed. Finally, the mixer or aerosol generator of FIG. 15 is similar, the emulsion inlet 814A being air insulated at 814E from any extended contact with the steam introduced through 814D. While fluid inlets directed tangentially may be employed, substantially linear flow at considerable velocity is preferred at the venturi or mixing areas, especially when the mixers of FIGS. 4, 17 and 12-15 are employed as aerosol generators.

In the form of FIG. 16, the aerosol generating equipment 1114, with pressure regulating valve 1415, discharges into the bowl 1115A of centrifugal bowl type coalescer-separator 1115 from which the gaseous phase (consisting principally of solvent-vapor) is withdrawn at 1115G to the condensor/vacuum system. The liquid phase separated in the device 1115 is delivered to a standpipe 1115L communicating with the vapor space in 1115, for the most part by way of the scoop off-take 115E. A pump 1115M controlled by the latex level in standpipe 1115L delivers the latex to outlet 1115N for recycle in part if desired to the input to pump 1114H and/or to the bowl 1115A by way of nozzle 1115K through a squeeze valve 1115P set to maintain a back pressure at 1115N when connected thereto. The latex coalesced and separated in 1115 is in contact with the solvent-vapor phase of the aerosol and therefore contains a trace of solvent due to the vapor pressure equilibrium. Latex of such solvent content is withdrawn through 1115Q and heated below its destabilization temperature, in heat exchanger 2115H (preferably a plate package type heat exchanger with pressure control 2115J and 2115J' connecting to coalescer-separator 2115). The heated latex and vapor (essentially steam with but a trace of solvent) are delivered to the partially evacuated centrifugal separator 2115 similar to 1115, and the latex delivered to its standpipe 2115L is similarly delivered to outlet 2115N for recycle via squeeze valve 2115P for further concentration in 2115H and 2115, and for delivery to product removal 2115Q as by pump 2115R. The latex so delivered is generally essentially free of solvent because of the very low solvent vapor pressure in 2115; however 2115Q may deliver to a further concentrator conforming to 2115-2115Q if desired.

FIG. 17 at 1313 illustrates one or more of the solvent polymer emulsion homogenizers 113, 213 or 313 of FIG. 2 (preferably the vibrating blade type emulsifier 313, FIG. 2) or 113D and 113D', FIG. 2A; 313, 313' and 313" FIG. 2B; which can be directly connected to the aerosol generator 1314 as is particularly desirable when operating with an unstable emulsion in which the solvent-polymer droplets are only temporarily of precursor latex particle size. As is well known to those skilled in the art the vibrating blade homogenizer or "Rapasonic" receives emulsion at medium pressure from a pump 1314H and forms it into a jet which impinges on the edge of a resonantly vibrating blade 1313A and the homogenized emulsion is delivered at a low gauge pressure through a choke valve 1313B and which has been described under FIG. 2 hereof. The generator 1314 with streamlined nozzle 1314A is as described in connection with FIG. 4, but may be replaced by other suitable devices, depending on the conditions to be met, particular forms of which are illustrated in FIGS. 12 to 15.

The invention will be most readily understood, and the basis for the aforesaid theory will be best appreciated, by reference to the following examples illustrating preferred embodiments of the invention and contrasting the same with other practices, but it will be understood that these examples are illustrative and not restrictive of the invention.

EXAMPLE 1.

Preparation of Fine Emulsion of Butyl Rubber Cement

With reference particularly to FIG. 2B a solvent/polymer composition at 160° F. is prepared from 4,350 lbs. of butyl rubber (Enjay Butyl Rubber No 268, a trademark product) and 19,750 lbs. of toluene and charged to mixer 110 via conduit 107 by opening valve 107A and closing valve 107B. The aqueous emulsifier solution at 160° F. comprising 970 lbs. of Alipal CO-433, 28% active (a trademark product), 52.2 lbs. of monosodium phosphate ($NaH_2PO_4$) and 10,000 lbs. of water is charged to mixer 110 via conduit 108 by closing valve 107C and opening valve 107B and valve 107A. By agitating vessel 110 the solvent/polymer composition and the aqueous emulsifier solution is uniformly mixed and fed by gravity by opening valve 109A to a series of three homogenizers 312, 312' and 312". The homogenizers are of the type described in U.S. Pat. No. 3,195,867 (issued to Moulds) and are operated according to my U.S. Pat. No. 3,622,127 at 5200 rpm with the aid of a 15 HP motor. Valves 109C, 109D and 109E are closed and the feed valve 109F is opened to feed tank 515.

Referring again to FIG. 2B, the crude emulsion is converted to a fine emulsion by feeding through three "Rapasonic" homogenizers 313, 313' and 313". The crude emulsion from surge tank 515 is fed by gravity to the constant flow triplex piston pump 501 operating at 300 psi by adjusting the pump speed and the by-pass or relief valve 501A. In this example all three of the Rapasonic homogenizers had the same size orifices and similar blade location settings and each homogenizer 313, 313' and 313" was operated at 300 psi and to tune the sonic blade of each homogenizer to its maximum energy output valves 503, 503' and 503" were adjusted so that the sonic cavity pressures according to gauges 509, 509' and 509" were about 30 psi. The Rapasonic homogenizers in this instance were operated without recycle valves 520, 520' and 520" being closed. The standpipe 516 was used to provide the 5 psi head to feed pumps 501, 501' and 501" and valves 522, 520A, 520A', 520A", 507A, 507A' were closed and valves 517', 507A and 507A' were open. The fine emulsion from homogenizer 313" is cooled and sent to storage tank 403 by closing valves 521V, 407" and 407, and opening valves 503", 521V, 407" and 407'. Cooler 405 cooled the fine emulsion to about 100° F. before entering storage tank 403, as an aqueous emulsion of solvent/polymer cement suitable for conversion to a latex according to Example 2.

EXAMPLE 2

Preparation of Latex from Fine Emulsion of Butyl Rubber Cement

The latex of this example is prepared with special reference particularly to FIGS. 2B, 3B and 7A. The fine emulsion of solvent/polymer composition from storage tank 403 of FIG. 2B is pumped via pump 114H' of FIG. 7A through conduit 114E' to mixer 114' which is supplied by steam through conduit 114D" controlled by valve 114D' and the emulsion and steam are mixed to form the latex aerosol in vapor which is discharged to separator 216' via conduit 215H controlled by valve 215H' which is partially closed so that the vapor pressure in mixer 114' registers 10 inches of mercury on the vacuum gauge while the vapor pressure in the separator registers 24 to 29 inches of mercury on the vacuum gauge. In the preparation of latex according to this example equipment similar to that set forth in FIG. 3B is employed except that only a single mixer (a) is employed with a fine aqueous emulsion of toluene butyl rubber cement being fed through conduit 2114E and the flow thereof being controlled by valve 2114H and the steam being controlled by valve 2114H and the steam being controlled by valve 2114D and the mixing taking place in mixing nozzle 2114(A). The pressure in the mixer is regulated by valve 2520' which is partially closed until the pressure is equivalent to 8 to 12 inches of mercury on the vacuum gauge PG. The aqueous emulsion of solvent/polymer composition is fed to the mixer at the rate of about 4 gallons per minute and having a dry solids content of 13.5% by weight and the steam is fed at a rate of about 11 lbs. per minute. The resulting aerosol of latex droplets and solvent vapor and water vapor are separated in separator 216' of FIG. 7A (2216 of FIG. 3B) with the vapors going overhead via line 216D' and 240D' to the vapor condensing system and the dilute latex being delivered from the separator 216' through conduit 216I' and recycled to the separator 216' via conduit 216F' through one of filters 230A' and 230B' and through conduit 216J' to one of heat exchangers 220A' or 220B' and with the latex flow to separator 216' being restricted by valves 221A' or 221B' depending on which of heat exchangers 220A' or 220B' was being operated and the flow rate through this circuit was 15 gallons a minute of latex having a solids content of 47% by weight. The latex product from this stripping stage is removed at the rate of 1.14 gallons per minute through line 216K and with the aid of pump 240D" and discharged through line 240H' via valve 240K or alternatively fed to the concentrator via line 216K'. The heat exchangers 220A' and 220B' are of the plate type consisting of 5 sets of 6 plates connected in series each set having 3 latex channels and 3 hot water channels alternately arranged. The latex flow through the 3 latex channels is at a rate of 15 gal./min. while the water flowed through the 3 water channels at a rate of 150 gal./min. and the water inlet temperature was 230° F. and the outlet temperature is 220° F. The temperature of the latex flowing out of the heat exchanger is below 220° F. and with the exact temperature being controlled by valves 221A' and/or 221B' and said valves preferably being of the hand or automatically adjustable types and adjusted so as to avoid boiling of the aqueous phase of the latex in the heat exchanger plate packages 220A' and/or 220B'. When boiling of the aqueous phase of the latex in the plate package is desired by opening of valves 221A' or 221B' then in the area of the plate package where the boiling takes place there may occur an increase in polymer coagulum and fouling of the heating plates exposed to ebullition.

By employing the dual sets of plate heaters 220A' and 220B' then solvent washing of one of the heat exchangers not in operation is carried out to dissolve and remove any coagulum adhering to the plate surfaces. The solvent washing equipment arrangement is shown in FIG. 3B wherein solvent is supplied at 2403 and alternatively plate heater 2220(A) and 2220(B) are solvent washed to remove any coagulum formed during concentration of the latex. Thus the process for stripping solvent/polymer composition according to this example is a continuous process except for momentary switch-overs from one plate heat exchanger to the other.

When starting up or when the pressure changes occur then foaming may occur in separator 216' and if this foam boils over through line 216D' then the foam is broken in knock-out pot 240' which may be heated as with steam. Any trapped latex can be returned via pump 240C' into recycle line 216" and the vapor leaves separator 240' via line 240D'. Level controllers operating the pumps are provided in all lines draining the separators 216', 240', 216" and 240" to pumps 216C', 240C', 216C" and 240C".

The latex flow in 216K' was 1–1.5 gal./min. and had a dry solids content of 47% to 63% by weight employing the concentrating unit as set forth in FIG. 7A. In this instance the emulsion/solvent stripping unit and the latex concentrating unit were about the same size, however, in order to operate both emulsion solvent stripping unit and the latex concentrating unit as a continuous process then the said stripping unit capacity should be about 5 times that of the concentrating unit for balance.

Continuing to refer to FIG. 7A the latex from surge tank 240E is pumped via pump 240E''' through conduit 216F" then through alternate filters 230A" and 230B" and conduit 216J" valves 219A" and 219B" the plate arrangements are similar to that of heat exchangers 220A' and 220B' described heretofore and referred to as a 6-6-6-6-6 plate arrangement and are heated by hot water or steam at 220° F. supplied at a rate of 150 gal./min. The valves 221A" and 221B" may be adjusted to permit boiling in the plate package, but if the conduit 222A' and 222B' are of sufficient length to complete the vaporization therein and avoid foaming in the separator, as in the present example, then it is preferable to adjust the valves 221A" and 221B" to avoid boiling in the plate package. The pressure in the plate package varies with the pumping rate and in this example the pressure was 50 psi at the plate package inlet and 1–2 psi at the valve outlet 221A" or 221B" and with water vapor boiling or flashing from the latex as it passes through the conduits 222A' and 222B' to separator 216" wherein the pressure was equivalent to a vacuum of 25 inches of mercury. When the velocity of the latex is high enough then vaporization takes place without foaming. If there is any tendency to foam then as foam breaker, latex or steam may be sprayed into the passages 222A and 222B between the heat exchangers and the separator as at 4114A in FIG. 3D. In the present example the velocity was high enough and the conduit long enough to avoid foaming.

The latex and water vapor passes into separator 216" and the water vapor is removed via conduit 216D" and latex recirculated with the aid of pump 216C". With the latex circulation in lines 216I" and 216J" at 15 gal./min., and latex of 47% dry solids by weight supplied by pump 240E''' at the rate of 1.14 gal./min., the latex product withdrawn with the aid of pump 240P was at the rate of 0.85 gal./min. and at a dry solids content of 63% by weight.

To avoid loss of latex on start-up when foaming may occur a knock-out pot is provided, 240", which breaks any foam and returns such via pump 240C" and by opening valve 240K" to line 216J".

EXAMPLE 3

Preparation of Fine Emulsion of Ethylene-Propylene Terpolymer

An ethylene-propylene terpolymer elastomer (Vistalon 6505) 1,110 lbs. is dissolved in 8,890 lbs of toluene to form a clear cement to which is added and emulsifier solution prepared by dissolving 535 lbs. (28% active) sodium salt of sulfonated nonylphenoxy-poly(ethyleneoxy)ethanol (Alipal CO-433, a trademark product), and 30 lbs. monosodium phosphate ($NaH_2PO_4$) in 4,720 lbs. of water.

The above recipe is converted into a fine emulsion in a manner similar to example 1 hereof. That is, the ethylene-propylene terpolymer cement in toluene at 80° C. is prepared in mixer 110, FIG. 2B and then is added the aqueous emulsifier solution at 80° C. After blending the ingredients are processed to an initial emulsion by passing through three high speed shear pumps 312, 312' and 312" arranged in series. The emulsion is then fed to tank 515 and to the three Rapasonic type emulsifying units 313, 313' and 313" arranged in series. These liquid whistles are operated at an input pressure of 500 psi registered on gauges 509, 509' and 509". The fine emulsion at 180° F. is passed through heat exchanger 405 and cooled to about 100° F. and stored in tank 403.

EXAMPLE 4

Preparation of Latex from Fine Emulsion of Ethylene-Propylene Terpolymer Cement

The latex of this example was prepared similar to example 2 with particular reference to FIGS. 3B and 7A.

The fine emulsion of ethylene-propylene terpolymer cement prepared according to example 3 is continuously stripped and concentrated in a unit of the type shown in FIG. 7A and the associated figures. The emulsion is fed through line 114E' at the rate of 4 gal./min. to mixer 114' (see 114, FIG. 4) and mixed with sufficient steam from line 114D" to volatilize essentially all of the toluene in the fine emulsion and the conditions are such that the temperature is 180° F. in mixer 114' and conduit 215H (for more details refer to conduit 3114 and 3114' arranged without valve 3519). The recycle flow to the separator 216' is about 10 gal./min. The latex at approximately 38% dry solids is removed from the stripping unit by closing valves 251V, 115V, 231V' and 114V''', and opening valves 114V and 231V'' to permit said latex to pass through conduit 114L' to centrifuge 250 (DeLaval Model No. 244, a trademark product). The latex of at about 50% dry solids is delivered through line 252 from the centrifuge 250. This 50% latex is diluted with water to about 30% dry solids by weight and recentrifuged to about 50% dry solids with an emulsifier content of about 5.1%.

EXAMPLE 4A

In a modification of Example 4, an alternate method of preparing latex of minimal emulsifier content is practiced. In this modification the fine emulsion is prepared by the method set forth in Example 3, but with only half the quantity of emulsifier. This emulsion low in emulsifier (which is not strippable per se) is then fed through line 114E' FIG. 7A and blended in mixer 114M with a stream of latex which is supplied by pump 114P through line 114L, which latex preferably has a dry solids content of about 50% and an emulsifier content of 6% based on the polymer content thereof. The quantities of latex and emulsion thus blended are such, depending on the ratios of emulsifier in the aqueous phase of each, that the blend contains sufficient emulsifier in the combined aqueous phases thereof to permit stripping essentially without production of congulum. In this modified example, this result is attained by blending about 1 part by weight of said fine emulsion of reduced emulsifier content with about 2 parts by weight of said latex, which blend is fed to the mixer-stripper 114' and mixed with sufficient steam to volatilize all of the solvent. The latex and solvent are then separated in separator 216' as above set forth in Example 4, and yields a latex of reduced emulsifier content based on the polymer phase, comparable to the content obtainable by dilution and centrifuging without this blending procedure, thus avoiding need of recourse to the use of centrifuge 250.

EXAMPLE 5

Preparation of Fine Emulsion from Cement of Butyl Rubber having Polar Groups

Solution "A" contains 40 pts. by wt. of butyl rubber having active polar groups (prepared according to U.S. Pat. No. 3,642,728) dissolved in 218 pts. by wt. of hexane and 42 pts. by wt. of N-propyl alcohol added. The emulsifier solution "B" contained 317 pts. by wt. of deionized water, 28.6 pts by wt. of an alkylphenol polyglycol ether containing 30 moles of ethylene oxides (Neutronyx 675 (25% active) a trademark product manufactured by GAF Corp.) and 26.8 pts. by wt. of N-propyl alcohol.

Referring to FIG. 2B, solutions "A" and "B" were fed to mixer 110 via line 107 and 108 at ambient temperature. The uniform mixture from mixer 110 was fed in succession to homogenizers 312, 312' and 312''. These homogenizers were operated according to my U.S. Pat. No. 3,622,127 with homogenizer 312 operating at 3100 rpm and homogenizers 312' and 312'' operated each at 4800 rpm to form the crude emulsion. The acidic crude emulsion was neutralized with 10% aqueous solution of sodium hydroxide to a pH of about 8.9 and was converted to a fine emulsion by feeding successively through three liquid whistles 313, 313' and 313'' (Rapasonic homogenizers, trademark products of Sonic Engineering Corp., Norwalk, Conn.) with the first homogenizer 313 operated at a feed pressure to the orifice of 250 psig according to gauge 508 which is located between pump 501 and the orifice and a pressure in the cavity into which the orifice discharges 25 psig according to gauge 509 and the second and third homogenizers 313' and 313'' fed at 500 psig according to gauges 508' and 508'' and discharged at a pressure of 50–60 psig according to gauges 509' and 509''.

The said fine emulsion of about 38% non-aqueous phase was diluted with deionized water to about 25% non-aqueous phase. The dilute fine emulsion was then fed via line 550F by opening valve 521V' to centrifuge 550 and the split was about 37% emulsion and 63% serum. The once centrifuged emulsion containing about 55% non-aqueous phase and was again diluted by adding equal pts. by wt. of deionized water and then a second time centrifuged with the split being about 46% emulsion and 53% serum. This twice centrifuged emulsion had a non-aqueous phase of about 50% and less than 4% emulsifier based on the polymer content.

This twice centrifuged emulsion was stable and was converted to a stable latex according to the procedure set forth in Example 6 hereof.

EXAMPLE 6

Preparation of Latex from Fine Emulsion of Butyl Rubber having Polar Groups

The fine emulsion of Example 5 is fed to mixer 114' via line 114E' of FIG. 7A with the aid of pump 114H'. Separator 216'' operating under a vacuum of 25 inches of mercury is fed by mixer 114.

The mixer 114' of FIG. 7A is fed with steam through line 114D'' and controlled by valve 114D' so there is sufficient steam to vaporize the solvent from the fine emulsion from Example 5 which is fed through line 114E' and mixer 114' is operated at a pressure of 10 inches of mercury with the aid of valve 215H'. The separator 216' is operated at a pressure of 25 inches of mercury. The stripped latex is circulated through the cycle starting with line 216I' with the aid of pump 216C' through filter 230A' and line 216J through heat exchanger 220A' to separator 216' and valves 221A' and 219A' are open with pump 216C' applying a pressure of 30 psi to heat exchanger 220A' and after a flow of latex through the heater 220A' was established which was several times as great, by weight, as the flow from 215H', then valves 251V and 114V were adjusted so that an amount of latex was removed from the circuit via 216K at an equal rate in solids to the input to separator 216' via line 215H. The said latex removed via 216K contained about 28% dry solids by weight and was conveyed by opening valve 231V'' through centrifuge 250 wherein the feed was split 54% by wt. serum and 46% by wt. latex. By this means the latex solids were increased to over 50% and the emulsifier content based on polymer was reduced about 50% to yield a stable aqueous latex of butyl rubber having polar groups.

EXAMPLE 7

Enlargement of Latex Particle Size

A butyl latex was prepared according to the method of Example 2 except that such latex contained by weight 5 parts oleic acid as the potassium salt and 5 parts or polymeric stabilizer having carboxyl groups. The dry solids of such latex was 57% by weight, its viscosity was 1500 centipoises, and its pH was 9.1. This latex was pumped through line 2413L FIG. 7B to a triplex pump where its pressure was raised to 500 psig and then passed through a vibrating reed homogenizer 263 (Rapasonic liquid whistle) with an outlet pressure of about 50 psig. and recycle pump 267 and product removal valve 116V were adjusted so that the latex averaged 9 passes through homogenizer 263. Prior to recycling through the homogenizer 263 the latex particle size averaged 1 micron in diameter with the largest particles being 3 microns in diameter. After recycling through the homogenizer 263 an average of 9 times, the average latex particle size increased to 2-3 microns diameter with the largest particles being 8 microns in diameter.

EXAMPLE 8

In this example a filler was incorporated in an elastomer cement solution and a latex prepared therefrom. The filler was a hydrated silica pigment of rubber reinforcing grade prepared from a sodium silicate solution with the aid of carbon dioxide followed by washing and treatment with sulfuric acid to slurry pH of 3.5 to provide an acidic wet silica pigment. The pigment in this example was prepared in essentially the same manner as Example 3 of U.S. Pat. No. 3,372,046 except that the acidulation was run at 73° C. instead of 80° C.

With 55.4 wt. parts of said acid treated wet silica pigment (containing 5.8 wt. parts, dry basis, of the rubber reinforcing grade silica pigment) was mixed 0.2 wt. parts of substituted imidazoline of tall oil (Monazoline T, a trade mark product) and 0.04 wt. parts of glacial acetic acid dissolved in 2.0 wt. parts of water. After thoroughly mixing the imidazoline acetate into the wet silica pigment slurry the combination was dried at 105° C. and micropulverized.

To 330 wt. parts of toluene cement containing 55 wt. parts of butyl rubber (Butyl 268) was added 5.5 wt. parts of the dried and micropulverized silica pigment prepared as aforesaid and said pigment was incorporated into the cement by high shear mixing.

The fine emulsion of the above cement containing silica was prepared in a manner essentially similar to Example 1 heretofore. Referring to FIG. 2B the elastomer-silica cement was charged to mixer 110 via conduit 107 and run through homogenizers 312, 312' and 312" and recycled to mixer 110 by opening valve 109H and closing valves 109F and 109G and heated to 160° F. To 334 wt. parts of the cement containing silica (viscosity 4300 cps at 33° C.) in mixer 110 was added 12.6 wt. parts of Alipal CO-433, 28% active (a trademark product) and 180 wt. parts of water at 160° F. and 0.6 wt. parts of monosodium phosphate. The emulsifier used was the sodium salt of the sulfate ester of nonylphenoxypoly(ethyleneoxy)ethanol.

The fine emulsion from mixer 110 via conduit 107 was run through homogenizers 312, 312' and 312" and then through Rapasonic homogenizers 313, 313' and 313" and was cooled to about 100° F. and sent to storage tank 403 as in Example 1 theretofore. Observation under the microscope showed the butyl cement emulsion particles containing the silica to be essentially in particle size range of 1-2 microns in diameter.

The fine emulsion of butyl rubber-silica cement was converted to a latex in a manner similar to Example 2 with particular reference to FIGS. 2B, 3B and 7A, the said fine emulsion from tank 403 of FIG. 2B being pumped via pump 114H' of FIG. 7A through conduit 114E' to mixer 114' supplied with sufficient steam through conduit 114D" and valve 114D' to convert essentially all of the toluene of the cement to toluene vapor. As in Example 2 the control valve 215H of FIG. 7A was adjusted until the mixer discharge pressure was equal to 10 inches of mercury while the pressure in separator 216' was equal to 23 inches of mercury.

The latex product from the separator cycle sampled by opening valve 240K had a dry solids of 29.8% and was concentrated to a latex by cycling through separator 216" and when sampled by opening valve 240K" had a dry solids of 44.5%. This latex concentration was conducted in a manner similar to that set forth in Example 2. Microscopic examination of the latex showed the silica pigment to be incorporated in the elastomer particles. A sample of the latex was dried and the ash thereof determined by heating to 1000° C. in air. The ash value of this elastomer-silica sample was 9.25% by weight which is comparable to the amount of silica pigment initially charged. The latex product of this example is useful in adhesive compositions.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included herein.

I claim:

1. An improved apparatus for continuously converting a coarse aqueous emulsion of a solvent/polymer cement to a fine emulsion in which substantially all of the cement particles constituting the discontinuous phase are of precursor latex particle size, said apparatus being of the type comprising:
   (a) a number of homogenizing units in which
   (b) each of said units comprises an inlet and an outlet chamber with a restricted orifice therebetween and pressure raising means between its inlet and its restricted orifice,
wherein the improvement comprises:
   (c) a source of supply of said coarse emulsion,
   (d) flow means connecting in series a sufficient number of said units to effect said conversion, with the inlet of the most upstream of said units connected to receive a flow of said coarse emulsion from said source of supply, the outlet chamber of each unit except the last connected to the inlet of the unit next downstream therefrom, and the outlet chamber of the last, most downstream, unit, connected to a discharge line,
   (e) said connecting means between said units each comprising a throttle valve and having connected thereto between said throttle valve and the inlet of the next downstream unit an "in"-check valve opening thereinto and a pressure relief limiting valve opening therefrom,
   (f) said "in"-check valves being connected to be supplied with fine emulsion delivered from the outlet chamber of a unit downstream thereof at a pressure to essentially maintain against pressure drop and provide a predetermined feed pressure to said next downstream unit, and (g) said pressure limiting valves being set to essentially maintain against pressure rise and provide the predetermined feed pressure to said most downstream unit, whereby the throttle valves control the back pressures in said outlet chambers while said in-check and pressure limiting valves control within fixed limits the pressures of the flows to the next succeeding units by adding to the flows between adjacent units, when necessary, minor proportions of fine emulsion from the flow being discharged from a unit downstream thereof and by removing from the flows between adjacent units, when necessary, minor proportions of the emulsion thereat.

2. An improved apparatus as claimed in claim 1, wherein at least one of said units comprises in its outlet chamber a vibratory reed positioned to be vibrated by the impingement thereon of the flow through its restricted orifice.

3. An improved apparatus as claimed in claim 2, wherein the most downstream of said units comprises in its outlet chamber a vibratory reed positioned to be vibrated by the impingement thereon of the flow through its restricted orifice.

4. An improved apparatus as claimed in claim 1, wherein each of said units comprises in its outlet chamber a vibratory reed positioned to be vibrated by the impingement thereon of the flow through its restricted orifice.

5. Apparatus as claimed in claim 1, which further comprises (h) means connected from the outlet chamber of one of said units between its restricted orifice and the next following throttle valve to a point upstream of said one unit for recycling a portion of the flow of emulsion passing through said orifice to broaden the size distribution of the precursor latex size particles in the converted emulsion.

6. Apparatus as claimed in claim 1, which further comprises (h) a separate homogenizer and (i) means connected to said discharge line and said separate homogenizer for splitting the flow from said discharge line into a plurality of flows, and further connected for recombining said split flows after passing one of the same through said separate homogenizer for altering the particle size thereof.

7. Apparatus as claimed in claim 1, further comprising a recycle means connecting the discharge of the pressure limiting valve controlling the feed pressure to one unit, referred to in clause (e), to a point in said flow means upstream of the next preceding unit.

8. Apparatus as claimed in claim 1, further comprising a recycle means connecting the discharge of the pressure limiting valve controlling the feed pressure to one unit, referred to in clause (e), to a point in said flow means upstream of the most upstream of said units.

* * * * *